US009999850B2

(12) United States Patent
Sweeney

(10) Patent No.: US 9,999,850 B2
(45) Date of Patent: Jun. 19, 2018

(54) FILTERING CONTAMINANTS FROM FLUID

(71) Applicant: Aqua Dynamics Process Technology Limited, London (GB)

(72) Inventor: Christopher William Sweeney, Exeter (GB)

(73) Assignee: AQUA DYNAMICS PROCESS TECHNOLOGY LIMITED, London (GB)

( * ) Notice: Subject to any disclaimer, the term of this patent is extended or adjusted under 35 U.S.C. 154(b) by 631 days.

(21) Appl. No.: 14/400,630

(22) PCT Filed: May 14, 2013

(86) PCT No.: PCT/GB2013/051239
§ 371 (c)(1),
(2) Date: Nov. 12, 2014

(87) PCT Pub. No.: WO2013/171476
PCT Pub. Date: Nov. 21, 2013

(65) Prior Publication Data
US 2015/0129508 A1 May 14, 2015

(30) Foreign Application Priority Data
May 15, 2012 (GB) .................................. 1208527.0

(51) Int. Cl.
B01D 29/66 (2006.01)
B01D 61/14 (2006.01)
(Continued)

(52) U.S. Cl.
CPC ............. B01D 29/66 (2013.01); B01D 35/12 (2013.01); B01D 61/147 (2013.01); B01D 61/22 (2013.01);
(Continued)

(58) Field of Classification Search
CPC ...... B01D 29/66; B01D 35/12; B01D 61/147; B01D 65/02; B01D 61/22; B01D 2321/04;
(Continued)

(56) References Cited

U.S. PATENT DOCUMENTS 3,505,215 A * 4/1970 Bray ..................... B01D 61/025
210/138
4,986,918 A * 1/1991 Breslau ................. B01D 61/145
210/321.69
(Continued)

FOREIGN PATENT DOCUMENTS

WO 2012/032354 3/2012

OTHER PUBLICATIONS

M. R. Mackley and N. E. Sherman, Cross-Flow Cake Filtration Mechanisms and Kinetics, Chemical Engineering Science, 1992, pp. 3067-3084, vol. 47. No. 12, Pergamon Press Ltd, Great Britain.

Primary Examiner — David C Mellon
(74) Attorney, Agent, or Firm — Kirton McConkie; Evan R. Witt

(57) ABSTRACT

A method of filtering contaminants from a fluid is disclosed. A feedstream of fluid containing contaminants is directed into a filter chamber containing a filter element. Part of the feedstream fluid flows in one of: a forward flow direction where it passes in a first direction through a wall of the filter element; and a reverse flow direction where it passes in a second, opposite direction through the wall. The filtrate is directed into a flowline for collection. The feedstream fluid is then arranged to flow through the filter element in the other direction, to remove contaminant material from a surface of the element wall. Following removal of contaminant material, the feedstream fluid is continued to be directed through the wall of the filter element in said other (Continued)

direction, to filter out contaminants from the fluid during flow in said other direction.

25 Claims, 11 Drawing Sheets

(51) Int. Cl.
  *B01D 61/22* (2006.01)
  *B01D 65/02* (2006.01)
  *B01D 35/12* (2006.01)

(52) U.S. Cl.
  CPC .......... *B01D 65/02* (2013.01); *B01D 2311/16* (2013.01); *B01D 2311/246* (2013.01); *B01D 2315/08* (2013.01); *B01D 2315/10* (2013.01); *B01D 2315/12* (2013.01); *B01D 2321/04* (2013.01); *B01D 2321/10* (2013.01); *B01D 2321/2083* (2013.01); *B01D 2321/40* (2013.01)

(58) Field of Classification Search
  CPC ............ B01D 2315/12; B01D 2321/40; B01D 2315/08; B01D 2311/246; B01D 2311/16; B01D 2321/2083; B01D 2321/10; B01D 2315/10

See application file for complete search history.

(56) References Cited

U.S. PATENT DOCUMENTS

| | | | | |
|---|---|---|---|---|
| 5,132,015 | A * | 7/1992 | Down | B01D 65/02 210/321.65 |
| 5,236,595 | A * | 8/1993 | Wang | B01J 39/04 210/141 |
| 5,372,722 | A | 12/1994 | Schwering et al. | |
| 5,690,829 | A | 11/1997 | Lauer | |
| 6,355,173 | B1 * | 3/2002 | den Bieman | B01D 65/02 210/636 |
| 6,692,786 | B1 * | 2/2004 | Denk | B01D 61/142 426/330.3 |
| 6,929,532 | B1 * | 8/2005 | Seaman | B24B 37/04 451/36 |
| 2003/0189006 | A1 | 10/2003 | Allen | |
| 2005/0230311 | A1 | 10/2005 | Rodenberg et al. | |

* cited by examiner

FILTERING CONTAMINANTS FROM FLUID

The present invention relates to methods of filtering contaminants from a fluid. The present invention also relates to a filter module for filtering contaminants from a fluid, and to a filtration plant comprising at least one such filter module. In particular, but not exclusively, the present invention relates to methods of filtering contaminants from a fluid in which a fluid containing contaminants is directed into a filter chamber containing at least one filter element; to a filter module comprising such a filter chamber; and to a filtration plant comprising at least one such filter module.

A variety of different types of filtration systems have been developed for filtering contaminants from a fluid. Systems for filtering hydrocarbon materials from water are of particular interest in the oil and gas exploration and production industry, where it is frequently necessary to clean a volume of water containing hydrocarbon materials, such as oil. For example, underground rock formations containing deposits of oil also typically comprise large volumes of water which are produced along with the recovered oil. This must be separated from the oil in the fluid which is recovered to surface, and the water has to be sufficiently clear from oil contaminants before it can be discharged back into the environment. The oil is usually present in the form of small droplets suspended in the water. Solids such as small grains of sand are also typically present in the produced water and must be handled by the filtration system.

The treatment of produced water from oil production has become an increasingly important issue in recent years, following the introduction of new regulations and the implementation of existing legislation. In particular, operators in the United Kingdom are now expected to reduce the level of hydrocarbon materials in produced water to 30 mg/l, and to meet annual total oil discharge limits in waters regulated under the Oslo and Paris Conventions for the protection of the marine environment of the North-East Atlantic (OSPAR). Often the annual load limits can only be achieved if the total hydrocarbon concentration is reduced to under 10 to 15 mg/l. In other parts of the world, levels of 10 to 15 mg/l are already in place.

It is also frequently necessary to filter small volumes of water from produced oil, before the oil can be processed. This might be to remove any suspended water droplets that are naturally present in the produced oil, and/or any water that has entered the wellbore and which has been recovered with the produced oil. Solids particles such as sand are also typically present in the produced oil and must be removed.

Several different processes and systems have been developed for the removal of dispersed oil from produced water. These include hydrocyclones, plate separators, induced gas flotation techniques, centrifuges, solid adsorbent systems and 'dead-end' filtration processes. Hydrocyclone and centrifuge systems are more complex and expensive to manufacture and operate than the other available systems.

In a hydrocyclone, the cyclone principle is employed, whereby components of different density are separated in a vortex which is generated by a high-flow rate nozzle leading into a vortex chamber.

Plate separators employ an accelerated gravity separation principle.

In gas flotation, oil is separated from water by the use of gas bubbles rising through the water; the gas may be added or may be air bubbles that are induced within the water.

In centrifuges, components of different density are separated by centrifugal forces which are generated in a mechanically rotated vessel.

One example of a solid-adsorbent system is one in which feedwater containing droplets of oil and fines (small dimension solids particles) is passed through a vessel which is packed with a solid material that adsorbs or physically retains the oil/fines. The material may be a powder, granules (such as in activated carbon systems) or other materials such as crushed nut shells. The filtrate (the treated water) passes through the vessel, and the oil/fines that are removed remain on the solid bed. The bed is often designed to be disposable, but may in some cases be regenerated by back-flushing.

One example of a 'dead-end' filtration process involves directing feedwater contaminated with oil into a filter. The filtrate (the treated water) passes through the filter and oil droplets and fines are retained within the filter. The filter can operate using an exclusion principle in which the pore sizes are smaller than the size of the oil droplets and fines, or by using a fouling layer. Several types of materials are used for the filters including woven cloth, polymer membranes, metal meshes and also ceramic membranes. The filters are sometimes capable of being regenerated by back-flushing with water or cleaning fluids, but often they are intended to be disposable, and consequently are discarded when the filters become "full" and the flow rate declines.

The major drawback of all of these systems and methods are that they cannot achieve—or cannot achieve at an economic cost or in an environmentally sustainable manner—the final oil levels as low as the 10 to 15 mg/l required, and often indeed cannot even achieve levels lower than around 20 to 30 mg/l, especially when the droplet sizes are at micron or sub-micron levels.

Another system which has been developed for use in these circumstances is the 'cross-flow' microfiltration process. This offers improved performance, but has its own inherent disadvantages.

Cross-flow systems typically make use of polymer or ceramic filter elements known as membranes, which are housed in a filter chamber. A cross-flow stream is directed through each filter membrane, and is used to remove oil and fines collected by the filter membranes, in a continuous stream of fluid known as a 'concentrate' stream. A primary aim of the cross-flow stream is to prevent the formation of a 'fouling layer' of contaminants on the surface of the filter membrane, which would otherwise impair the performance of the membrane. Consequently, the cross-flow velocity in cross-flow microfiltration systems has conventionally been maintained relatively high, in order to prevent the formation of a fouling layer. Filtration is thus exclusively by size-exclusion, the minimum dimension of contaminant droplets/ fines that can be excluded being determined by the pore size of channels in the filter membrane. Thus only contaminants having larger sizes than the pore size of the membrane are collected.

There are a number of disadvantages to such cross-flow systems. Firstly, when small droplets/particles are present, a relatively small pore size (typically 0.2 to 4 microns, depending on the desired final oil level) is needed. This causes a significant reduction in the 'flux' through the filter membrane (the volume of fluid that flows through a unit area of the filter membrane per unit time), with resultant increases in pump pressure and thus power as well as wear on system components, all of this having an impact on costs. Indeed, whilst cross-flow microfiltration systems can achieve the required concentration levels, it is not an attractive option for high throughput applications, such as in oilfield produced water treatment. This is because the capital and operating costs are very high, and are substantially higher even than the costs for hydrocylones and centrifuges.

The footprint of a cross-flow microfiltration plant is also relatively large, and may not be feasible in offshore environments, such as on a rig, where space is at a premium.

It has additionally been found that, in spite of the high cross-flow velocity in cross-flow microfiltration systems, a fouling layer can form, which is undesired and quickly impairs performance. When it is detected that a fouling layer has formed (by reduced flux and/or increased back-pressure), it has been known to halt the filtration process and to attempt to remove the fouling layer by directing a "back-pulse" of fluid in the reverse direction through the filter membrane. This involves intermittently pumping the filtrate or air backwards through the membrane for a short time, typically around 1 to 5 seconds. Once it is judged that the fouling layer has been removed, filtration resumes in the forward flow direction. Frequently however, the small pore sizes required in such cross-flow systems can result in permanent, irretrievable blockage of the pores of the filter membrane, particularly by deposited fines. This requires that the module containing the membrane be taken out of service and the membrane replaced, reducing efficiency of the process and increasing costs.

It will be appreciated that the above systems and methods may have application in other industries, and indeed for the filtering of other types of contaminant materials from different types of fluids. Indeed, the contaminants may be any one of a wide range of different materials. Similarly, the fluid from which the contaminant is to be filtered may also be one of a wide range of different fluids, and may typically be an aqueous solution/mixture, water, a hydrocarbon material such as oil, or some other solvent. In each case however, similar disadvantages or problems to those outlined above may be encountered.

It is amongst the objects of at least one embodiment of the present invention to obviate or mitigate at least one of the foregoing disadvantages.

According to a first aspect of the present invention, there is provided a method of filtering contaminants from a fluid, the method comprising the steps of:
  directing a feedstream of a fluid containing contaminants into a filter chamber containing at least one filter element;
  arranging at least part of the feedstream fluid directed into the filter chamber to flow in one of
    A. a forward flow direction where the fluid passes in a first direction through a wall of the filter element; and
    B. a reverse flow direction where the fluid passes in a second, opposite direction through the wall of the filter element;
  directing the filtrate out of the chamber and into a filtrate flowline for collection;
  subsequently arranging the feedstream fluid directed into the filter chamber to flow through said filter element in the other one of the forward and reverse flow directions, to remove contaminant material from a surface of the wall of the element;
  following removal of said contaminant material by fluid flow in the other one of the forward and reverse flow directions, continuing to direct feedstream fluid through the wall of the filter element in said other direction to thereby filter out contaminants from the fluid during flow in said other direction; and
  subsequent to removal of said contaminant material, directing the filtrate resulting from flow through the wall of the filter element in said other flow direction out of the chamber and into the filtrate flowline for collection.

The flows in the forward and reverse directions may be of the same duration or of different durations. The rates of flow in the forward and reverse directions may be the same or may be different.

In contrast to prior cross-flow processes and systems, the method of the first aspect of the invention involves active filtration of contaminants from the feedstream fluid in the other one of said flow directions. Thus, for example, where filtration is initially in the forward flow direction, the flow is changed to the reverse flow direction, and flow is maintained in the reverse direction, contaminants being filtered from the fluid during such reverse flow. This offers advantages including reducing downtime and improved efficiency.

The method may comprise the further step of monitoring at least one parameter and, optionally, on detecting a predetermined change in the at least one parameter, taking the step of arranging the feedstream fluid to flow through the wall of the filter element in the other one of the forward and reverse flow directions. The step of arranging the feedstream fluid to flow through the wall of the filter element in the other one of the forward and reverse flow directions may be taken after a predetermined time period or interval. The step of arranging the feedstream fluid to flow through the wall of the filter element in the other one of the forward and reverse flow directions may be taken on the first to occur of: detection of the predetermined change in the at least one parameter; and expiry of the predetermined time period. Thus, for example, where filtration is initially in the forward flow direction, the flow may be changed to the reverse flow direction on detection of said change in the at least one parameter and/or expiry of the predetermined time period.

The parameter may be the 'flux' through the filter element, that is the rate of flow per unit area through the filter element. The flux will decrease as contaminant material builds up on the surface of the wall of the filter element. The feedstream fluid may be arranged to flow in said other direction on detection of the flux reaching a predetermined threshold level. The parameter may be the concentration of contaminants in the filtrate. An increase in the concentration of contaminants may be indicative of a deterioration in performance, requiring a change in the direction of flow to clean the surface of the wall of the filter element. The method may comprise monitoring the concentration of contaminants in the filtrate during flow in said other direction and, on detecting that the concentration of contaminants has fallen to a desired level, directing the filtrate into the filtrate flowline for collection. The contaminant may be or may comprise any one of a wide range of different materials, but may in particular comprise hydrocarbon material, and may be an oil or oils, and the material may be present in the feedstream fluid in the form of suspended droplets. The contaminant may be or may comprise water. The contaminant may be or may comprise granular rock materials such as sand. The contaminant may be chemicals that are added to water for various process reasons. For example polymeric chemicals may be added to oilfield produced water for enhanced oil recovery, and ceramic materials may be added to "fracking" fluids in shale gas processes. It will be understood that references herein to a contaminant or contaminants present in the fluid are to a material or materials present in the fluid and which it is desired to remove. The contaminant is a different material from that of the fluid. The contaminant may be or may comprise a fluid and/or solids material. The fluid from which the contaminant is to be filtered may also be one of a wide range of different fluids, and may typically be an aqueous solution/mixture, water, a hydrocarbon material such as oil, or some other solvent.

According to a second aspect of the present invention, there is provided a method of filtering contaminants from a fluid, the method comprising the steps of:
directing a feedstream of a fluid containing contaminants into a filter chamber containing at least one filter element;
arranging part of the feedstream fluid directed into the filter chamber to flow through a wall of said filter element and directing the filtrate out of the chamber and into a filtrate flowline for collection; and
arranging a remainder of the feedstream fluid directed into the filter chamber to flow in a cross-flow bleed stream across said filter element and into a bleed flowline;
wherein a velocity of the fluid flowing across said filter element in the cross-flow bleed stream is no more than about 4 m/s, to promote the formation of a fouling layer of contaminant material on a surface of the filter element, such that the filtering of further contaminant material is achieved by means of a combination of the filter element and the fouling layer.

In contrast to prior cross-flow processes and systems, the method of the second aspect of the invention involves directing fluid in a cross-flow bleed stream across the filter element with a velocity of no more than about 4 m/s, to promote the formation of a fouling layer. The inventors have recognised that the formation of a fouling layer can be beneficial to the effective filtration of contaminants. In the prior processes and systems, it is specifically taught that the formation of a fouling layer is detrimental and so the bleed stream fluid velocity is maintained relatively high (and higher than 4 m/s), to impair formation of a fouling layer.

According to a third aspect of the present invention, there is provided a method of filtering contaminants from a fluid, the method comprising the steps of:
directing a feedstream of a fluid containing contaminants into a filter chamber containing at least one filter element;
arranging part of the feedstream fluid directed into the filter chamber to flow through a wall of said filter element and directing the filtrate out of the chamber and into a filtrate flowline for collection; and
arranging a remainder of the feedstream fluid directed into the filter chamber to flow in a cross-flow bleed stream across said filter element and into a bleed flowline;
wherein a volume of the feedstream fluid that is arranged to flow in the cross-flow bleed stream across said filter element is at least about 5% of the total volume of the fluid in the feedstream.

In contrast to prior cross-flow processes and systems, the method of the third aspect of the invention involves directing at least about 5% of the total volume of fluid in the feedstream in a cross-flow bleed stream across the filter element. In the prior processes and systems, it is specifically desired that the amount of fluid in the bleed stream be maintained as low a proportion as possible of the total volume of fluid in the feedstream (less than 5% and typically around 1%), in order to maximise flow through the filter element and thus throughput. In the present invention, the direction of a relatively greater proportion of the feedstream fluid along the cross-flow bleed stream provides greater freedom to 'tune' the method of the third aspect according to particular requirements of the method than would be the case with prior processes and systems.

According to a fourth aspect of the present invention, there is provided a method of filtering contaminants from a fluid, the method comprising the steps of
directing a feedstream of a fluid containing contaminants into a filter chamber containing at least one filter element;
arranging part of the feedstream fluid directed into the filter chamber to flow through a wall of said filter element and directing the filtrate out of the chamber and into a filtrate flowline for collection; and
arranging a remainder of the feedstream fluid directed into the filter chamber to flow in a cross-flow bleed stream across said filter element and into a bleed flowline;
wherein the fluid in the cross-flow bleed stream is arranged to flow with a laminar flow profile, to promote the formation of a fouling layer of contaminant material on a surface of said filter element, such that the filtering of further contaminant material is achieved by means of a combination of the filter element and the fouling layer.

In contrast to prior cross-flow processes and systems, the method of the fourth aspect of the invention involves directing fluid in a cross-flow bleed stream in which the fluid is arranged to flow with a laminar flow profile, to promote the formation of a fouling layer. The inventors have recognised that the formation of a fouling layer can be beneficial to the effective filtration of contaminants. In the prior processes and systems, it is specifically taught that the formation of a fouling layer is detrimental, and so the fluid in the bleed stream is arranged to flow with a turbulent flow profile in order to impair formation of a fouling layer.

According to a fifth aspect of the present invention, there is provided a method of filtering contaminants from an aqueous fluid, the method comprising the steps of:
directing a feedstream of an aqueous fluid containing contaminants into a filter chamber containing at least one filter element;
arranging part of the feedstream fluid directed into the filter chamber to flow through a wall of said filter element and directing the filtrate out of the chamber and into a filtrate flowline for collection; and
arranging a remainder of the feedstream fluid directed into the filter chamber to flow in a cross-flow bleed stream across said filter element and into a bleed flowline;
wherein the fluid is arranged to flow in the cross-flow bleed stream such that it has a Reynolds number of no more than about 2500, to promote the formation of a fouling layer of contaminant material on a surface of said filter element, such that the filtering of further contaminant material is achieved by means of a combination of the filter element and the fouling layer.

In contrast to prior cross-flow processes and systems, the method of the fifth aspect of the invention involves directing fluid in a cross-flow bleed stream in which the fluid is arranged to flow with a Reynolds number of no more than about 2500, to promote the formation of a fouling layer. The inventors have recognised that the formation of a fouling layer can be beneficial to the effective filtration of contaminants. In the prior processes and systems, it is specifically taught that the formation of a fouling layer is detrimental, and so the Reynolds number of the fluid in the bleed stream is arranged to be significantly greater than 2500, in order to impair formation of a fouling layer.

According to a sixth aspect of the present invention, there is provided a method of filtering contaminants from a fluid, the method comprising the steps of:

directing a feedstream of a fluid containing contaminants into a filter chamber containing at least one filter element having a plurality of pores for filtering contaminants from the feedstream fluid, the pore size being no less than about 4 microns;

arranging at least part of the feedstream fluid directed into the filter chamber to flow through a wall of said filter element and directing the filtrate out of the chamber and into a filtrate flowline for collection;

arranging a remainder of the feedstream fluid directed into the filter chamber to flow in a cross-flow bleed stream across said filter element and into a bleed flowline; and controlling one or more parameter of the cross-flow bleed stream to promote the formation of a fouling layer on a surface of said filter element, such that the filtering of contaminant material can be achieved by a combination of the filter element and the fouling layer.

In contrast to prior cross-flow processes and systems, the method of the sixth aspect of the invention involves directing the feedstream fluid into a filter chamber containing a filter element having a plurality of pores with a pore size of no less than about 4 microns. In the prior processes and systems, a relatively small pore size is required when it is desired to filter small droplets or particles. Typical pore sizes may be 0.2 to 1.2 microns. Filtration is by size-exclusion, and the separated contaminants (droplets/fines) have larger sizes than the pore size of the filter element. It is specifically taught that the formation of a fouling layer should be avoided, on the basis that this blocks the relatively small pores and quickly impairs performance. Indeed, it has been found that the pores may become irretrievably blocked, as discussed above. The inventors have recognised that the formation of a fouling layer, in a method involving a cross-flow bleed stream across a filter element, can be beneficial to the effective filtration of contaminants. Consequently, the inventors have recognised that the pore size of the filter element can be increased, with consequential benefits in terms of increased flux and therefore throughput, leading to greater efficiency and cost savings. An additional benefit from increasing the pore size is that this helps to prevent irreversible fouling of filter elements (membranes) that can occur due to the penetration into the pores of solid particles having comparable sizes to the pores. Another benefit is the higher flux which results from using a filter element having larger pores than those employed in prior processes.

The methods of any one of the first to sixth aspects of the invention defined above may share one or more feature with one or more other aspect of the invention.

Thus the method of any one of the second to sixth aspects of the invention may comprise arranging said part of the feedstream fluid directed into the filter chamber to flow in one of:

A. a forward flow direction where the fluid passes in a first direction through a wall of the filter element; and B. a reverse flow direction where the fluid passes in a second, opposite direction through the wall of the filter element;

directing the filtrate out of the chamber and into a filtrate flowline for collection;

subsequently arranging the feedstream fluid directed into the filter chamber to flow through said filter element in the other one of the forward and reverse flow directions, to remove contaminant material from a surface of the wall of the element;

following removal of said contaminant material by fluid flow in the other one of the forward and reverse flow directions, continuing to direct feedstream fluid through said filter element in said other direction to thereby filter out contaminants from the fluid during flow in said other direction; and subsequent to removal of said contaminant material, directing the filtrate resulting from flow through said filter element in said other flow direction out of the chamber and into the filtrate flowline for collection.

The method may comprise the further step of monitoring at least one parameter and, optionally, on detecting a predetermined change in the at least one parameter, taking the step of arranging the feedstream fluid to flow through the filter element in the other one of the forward and reverse flow directions. The step of arranging the feedstream fluid to flow through the filter element in the other one of the forward and reverse flow directions may be taken after a predetermined time period. The step of arranging the feedstream fluid to flow through the filter element in the other one of the forward and reverse flow directions may be taken on the first to occur of: detection of the predetermined change in the at least one parameter; and expiry of the predetermined time period.

The method of the first aspect of the invention may be a dead-end filtration method where all of the feedstream fluid is directed through the wall of the filter element(s). However, the method of the first aspect of the invention may comprise arranging at least part of the feedstream fluid directed into the filter chamber to flow in one of the forward and reverse flow directions; and arranging a remainder of the feedstream fluid directed into the filter chamber to flow in a cross-flow bleed stream across the filter element and into a bleed flowline. The fluid flowing across the filter element in the cross-flow bleed stream may be arranged to flow with a velocity of no more than about 4 m/s, to promote the formation of a fouling layer of contaminant material on a surface of the filter element, such that the filtering of further contaminant material is achieved by means of a combination of the filter element and the fouling layer. A volume of the feedstream fluid that is arranged to flow in the cross-flow bleed stream across the filter element may be at least about 5% of the total volume of the fluid in the feedstream. The fluid in the cross-flow bleed stream may be arranged to flow with a laminar flow profile, to promote the formation of a fouling layer of contaminant material on a surface of the filter element, such that the filtering of further contaminant material is achieved by means of a combination of the filter element and the fouling layer. The feedstream fluid may be aqueous, and the fluid in the cross-flow bleed stream may be arranged to flow in the bleed stream such that it has a Reynolds number of no more than about 2500, to promote the formation of a fouling layer of contaminant material on a surface of the filter element, such that the filtering of further contaminant material is achieved by means of a combination of the filter element and the fouling layer. The step of directing the feedstream of a fluid containing contaminants into the filter chamber may comprise directing the feedstream into a filter chamber containing a filter element having a plurality of pores for filtering contaminants from the feedstream fluid, the pore size being no less than about 4 microns; and controlling one or more parameter of the cross-flow bleed stream to promote the formation of a fouling layer on a surface of the filter element, such that the filtering of contaminant material can be achieved by a combination of the filter element and the fouling layer.

The method of any one of the second to sixth aspects of the invention may include one or more of the following features, as appropriate. The feedstream fluid may be aqueous, and the fluid in the cross-flow bleed stream may be arranged to flow such that it has a Reynolds number of no more than about 2500, to promote the formation of a fouling layer of contaminant material on a surface of the filter element, such that the filtering of further contaminant material is achieved by means of a combination of the filter element and the fouling layer. Fluid in the cross-flow bleed stream may be arranged to flow with a laminar flow profile, to promote the formation of a fouling layer of contaminant material on a surface of the filter element, such that the filtering of further contaminant material is achieved by means of a combination of the filter element and the fouling layer. A volume of the feedstream fluid that is arranged to flow in the cross-flow bleed stream across the filter element may be at least about 5% of the total volume of the fluid in the feedstream. A velocity of the fluid flowing across the filter element in the cross-flow bleed stream may be no more than about 4 m/s, to promote the formation of a fouling layer of contaminant material on a surface of the filter element, such that the filtering of further contaminant material is achieved by means of a combination of the filter element and the fouling layer. The step of directing the feedstream of a fluid containing contaminants into the filter chamber may comprise directing the feedstream into a filter chamber containing a filter element having a plurality of pores for filtering contaminants from the feedstream fluid, the pore size being no less than about 4 microns; and controlling one or more parameter of the cross-flow bleed stream to promote the formation of a fouling layer on a surface of the filter element, such that the filtering of contaminant material can be achieved by a combination of the filter element and the fouling layer.

Further optional features of the methods of any of the first to sixth aspects of the present invention are as follows.

The method may employ at least one filter element which is hollow. The method may comprise arranging at least part of the feedstream fluid directed into the filter chamber to flow in one of:
  A. a forward flow direction where the fluid passes in a first direction through a wall of the filter element from an inside of the element to an outside of the element; and
  B. a reverse flow direction where the fluid passes in a second, opposite direction through the wall of the filter element from an outside of the element to an inside of the element.

The method may employ at least one filter element which is in the form of a generally flat plate having opposed first and second surfaces. The method may comprise arranging at least part of the feedstream fluid directed into the filter chamber to flow in one of:
  A. a forward flow direction where the fluid passes in a first direction through a wall of the filter element from the first surface towards the second surface; and
  B. a reverse flow direction where the fluid passes in a second, opposite direction through the wall of the filter element from the second surface towards the first surface.

The method may employ at least one filter element having other desired shapes or of other configurations.

Where flow through the filter element is in the forward flow direction, a fouling layer of contaminant material forms on an inner or internal surface, or a first surface, of the filter element. The fluid may be arranged to flow in the reverse flow direction to remove at least part of the fouling layer formed on said surface of the filter element. Where flow through the filter element is in the reverse flow direction, a fouling layer of contaminant material forms on an outer or external, or a second opposed surface of the filter element. The fluid may be arranged to flow in the forward flow direction to remove at least part of the fouling layer formed on said surface of the filter element. The method may comprise the further step of, subsequent to the removal of said contaminant material and filtration in the other one of the forward and reverse flow directions, arranging the feedstream fluid directed into the filter chamber to again flow through the filter element in the one of the forward and reverse flow directions which was initially selected, to remove contaminant material from a surface of a wall of the element which has resulted from fluid flow in the other one of the forward and reverse flow directions. Flow may continue in this flow direction and, subsequent to removal of said contaminant material, the filtrate resulting from such flow may be directed out of the chamber and into the filtrate flowline for collection. The method may comprise sequentially changing the direction of flow of the feedstream fluid between the forward and reverse flow directions as appropriate, in response to detection of the pre-determined change in the measured parameter and/or expiry of the predetermined time period discussed above.

The hollow filter element may be tubular, and may be a generally cylindrical tubular filter element. The filter element may define a central void, passage or channel extending along a length thereof. During flow of fluid in the forward flow direction, fluid may pass from the central void outwardly through the wall of the filter element to the outside of the element, and may flow in a substantially radial direction. A space may be defined between an internal surface of the filter chamber and an external surface of the filter element, and fluid passing through the wall of the filter element may enter the space. The filter chamber may be generally cylindrical in shape. During flow in the reverse flow direction, fluid may pass from the space inwardly through the wall of the filter element and into the central void, and may flow in a substantially radial direction. When the part of the feedstream fluid directed into the filter chamber and through the wall of the filter element is flowing in the forward flow direction, the part of the fluid flowing in the cross-flow bleed stream may flow through the central void of the filter element. When the part of the feedstream fluid directed into the filter chamber and through the wall of the filter element is flowing in the reverse flow direction, the part of the fluid flowing in the cross-flow bleed stream may flow in a direction through the space defined between the internal surface of the filter chamber and along the external surface of the filter element.

Following completion of at least one cycle of flow of feedstream fluid in the forward flow and reverse flow directions, and in the event that the predetermined change in the measured parameter occurs within a reduced time period (which might be indicative of an impairment in filtration performance), the method may comprise the step of cleaning the filter element. The impairment may be due to contaminant material remaining following flow reversal, and which may block at least some of the pores. The step of cleaning the filter element may comprise directing a cleaning fluid into the filter chamber and arranging the fluid to flow in either the forward or reverse flow direction. It may be beneficial if the direction of cleaning fluid which is selected is opposite to the direction that fluid was flowing when the impairment in performance was detected. However, the cleaning fluid may flow in the same direction. Use of a cleaning fluid may prevent further build-up of contaminants on or in the filter element. The cleaning fluid may be directed through the wall of the filter element in the selected one of the forward and reverse flow directions for a predetermined time period whilst monitoring the at least one parameter, and may comprise subsequently directing fluid in the other one of the forward and reverse flow directions for a predetermined time period and whilst monitoring the at least one parameter. Further flow reversals may be performed during the cleaning process. When it is determined that the performance of the filter element has been returned to an acceptable level, the method may comprise the step of re-directing feedstream fluid into the filter chamber and arranging the fluid to flow through the wall of the filter element in a selected one of the forward and reverse flow directions.

The method may comprise directing the feedstream of the fluid into a filter chamber containing a plurality of filter elements. The provision of a plurality of filter elements may provide a greater flux of filtrate for a chamber of a given size. The method may comprise arranging at least part of the feedstream fluid directed into the filter elements to flow in one of the forward and reverse flow directions. The method may comprise combining the flow of filtrate of each filter element and directing the combined flow out of the chamber and into the filtrate flowline.

The method may comprise directing the feedstream of fluid into a plurality of filter chambers, optionally from a common source, each filter chamber containing a plurality of filter elements. This may enable at least one of the filter chambers to be taken offline, for example for cleaning or maintenance purposes, with filtration through at least one further filter chamber continuing during this process. The method may comprise directing feedstreams of fluid into filter modules, each module defining or comprising a filter chamber. The method may comprise taking at least one of the filter modules/chambers offline for the purpose of the flow reversal cycle, with filtration through at least one further filter chamber continuing during this process. In this way, flow reversal cycles through all the chambers can be carried out in a sequential manner.

The at least one parameter which is measured may be selected from the group comprising the flux through the filter element; a pressure drop measured across the filter element; and/or a proportion or concentration of contaminants remaining in the filtrate. An operating flux through the filter element may typically be in the range of about 800 to about 4000 l/m$^2$/h; typical fluxes in prior cross-flow filtration processes are around 200 to 400 l/m$^2$/h. Reference to an operating flux should be taken to be a flux through the filter element during a period in the method at which filtration is occurring, the filtrate is being directed to the filtrate line, and the concentration of contaminants remaining within the filtrate is within specification (and thus within acceptable levels, which may be between around 1 mg/l to around 10 mg/l, but which could be even lower and may be less than around 1 mg/l). On start-up, the flux may be higher and may be up to around 9000 l/m$^2$/h. As contaminants build-up to form a fouling layer on a surface of the filter element, the flux may reduce to an operating level sufficient to carry out an effective filtration of contaminants from the feedstream fluid (measured by determining the proportion of contaminants in the filtrate) whilst providing sufficient fluid throughput. When it is determined that the proportion of contaminants in the filtrate has reached an acceptable level, the filtrate may be directed into the filtrate flowline for collection. When the flux had dropped to a lower level, which may be towards a lower extreme of the above range (this being indicative of the fouling layer building up to a sufficient thickness that throughput is being overly restricted, and/or that pores of the filter element are becoming blocked), the feedstream fluid directed into the filter chamber may be arranged to flow in the other one of the forward and reverse flow directions.

The volume of the feedstream fluid that is arranged to flow in the cross-flow bleed stream may be at least about 10%, and may be at least about 15% of the total volume of the fluid in the feedstream. The volume may be no more than about 10%, may be no more than about 15%, and may be no more than about 20% of the total volume of the fluid in the feedstream. The volume of the bleed stream may be adjusted for the particular properties of the feedstream such as the concentration and physical/chemical properties of dispersed oil and solids and the viscosity of the feed stream. The bleed stream flow rate can also be adjusted to optimise several parameters including the required quality of the filtrate, the overall process flow rate, the frequency of flow reversal cycles and the frequency of cleaning operations.

In the forward flow direction, for hollow filter elements, the velocity of the fluid flowing in the cross-flow bleed stream may be defined as: the feed flow rate of the feedstream fluid into the filter chamber (m$^3$/s) divided by the cross-sectional area of the central void of the filter element, or the sum of the cross-sectional areas of the central voids of the various filter elements (m$^2$). Where there are a plurality of filter chambers, the velocity of the fluid flowing in the cross-flow bleed streams may be equal to the combined feed flow rate of the feedstream fluid into all of the filter chambers (m$^3$/s) divided by the sum of the cross-sectional areas of the central voids of all of the filter elements (m$^2$). In the reverse flow direction, the velocity of the fluid flowing in the cross-flow bleed stream may be defined as: the feed flow rate of the feedstream fluid into the filter chamber (m$^3$/s) divided by the cross-sectional area of the space defined between the internal surface of a filter module defining the filter chamber and the external surface of the filter element or elements (m$^2$). Where there are a plurality of filter chambers, the velocity of the fluid flowing in the cross-flow bleed streams may be equal to the combined feed flow rate of the feedstream fluid into all of the filter chambers (m$^3$/s) divided by the sum of the cross-sectional areas defined between the internal surfaces of the filter chambers and the external surfaces of the filter elements (m$^2$).

For flat plate filter elements, the velocity of the fluid flowing in the cross-flow bleed stream may be defined as: the feed flow rate of the feedstream fluid into the filter chamber (m$^3$/s) divided by a cross-sectional area of a bleed stream flow passage (m$^2$). The flow passage may be bound by a module defining the filter chamber and one or more filter element. Where there are a plurality of filter chambers, the velocity of the fluid flowing in the cross-flow bleed streams may be equal to the combined feed flow rate of the feedstream fluid into all of the filter chambers (m$^3$/s), divided by the sum of the cross-sectional areas of all the bleed stream flow passages.

In fluid mechanics, Reynolds number provides an indication of the ratio of inertial forces to viscous forces. For an aqueous fluid/water, a Reynolds number of no more than about 2500 may result in laminar flow and, in the context of the present invention, the promotion of the formation of a fouling layer on a surface of the wall of the filter element. For other fluids, such as hydrocarbon containing fluids (for example, oil) containing contaminants such as small volumes of water, different Reynolds numbers may be indicative of laminar flow. Equally, different Reynolds numbers may be indicative of laminar flow in the case of other fluids, for example organic solvents.

The filter element may be microporous. The pore size of the pores in the filter element may be no less than about 4 microns, may be no less than about 10 microns may be no less than about 15 microns, may be no less than about 20 microns, and may be no less than about 30 microns. The pore size may be no greater than about 15 microns. The pore size may be no greater than about 20 microns. In the present invention, it may be possible to filter contaminants of around 0.1 microns and larger with a filter element having pores of a size of about 4 microns; and 1 micron and larger with a filter element having pores of a size of about 15 microns or greater. The pores in the filter element may be in the form of passages which extend between internal and external surfaces of the filter element. The pores may typically be generally circular in cross-section, and may be cylindrical. The pores may be paths through the membrane where the pore size may be defined in terms of the largest particle that can pass through the membrane. Reference to a 'size' of the pores will therefore generally be understood by persons skilled in the art to refer to a diameter or cross-sectional area of the pores.

According to a seventh aspect of the present invention, there is provided a filter module for a filtration plant, the filter module being for filtering contaminants from a fluid and comprising:
  a filter chamber containing at least one filter element, the filter element arranged to filter contaminants from a feedstream of a fluid directed into the filter chamber and through a wall of the filter element;
  wherein the filter element has a plurality of pores for filtering contaminants from the feedstream fluid; and
  wherein the pore size is no less than about 4 microns.

According to an eighth aspect of the present invention, there is provided a filtration plant for filtering contaminants from a fluid, the plant comprising:
  at least one filter module, the at least one filter module comprising a filter chamber containing at least one filter element, the filter element arranged to filter contaminants from a feedstream of a fluid directed into the at least one filter chamber and through a wall of the filter element;
  wherein the filter element has a plurality of pores for filtering contaminants from the feedstream fluid; and
  wherein the pore size is no less than about 4 microns.

The filter element may be microporous. The pore size of the pores in the filter element may be no less than about 4 microns, may be no less than about 10 microns and may be no less than about 15 microns. The pore size may be no greater than about 15 microns. The pore size may be no greater than about 20 microns. The pore size may be no greater than about 30 microns. The pore size may be larger than 30 microns. The pore size can be larger than the sizes of the oil droplets and fines that are removed. For example, the present invention may facilitate the removal of droplets and fines that are around 0.1 microns and larger with a filter element having pores of a size of about 4 microns; or around 1 micron in size by filter elements with a pore size of around 15 microns. The pores in the filter element may be in the form of passages which extend between internal and external surfaces of the filter element.

The pores may typically be circular in cross-section and may be generally cylindrical. Reference to a 'size' of the pores will therefore generally be understood by persons skilled in the art to refer to a diameter or cross-sectional area of the pores.

Further features of the module and/or the plant of the seventh and eighth aspects of the present invention may be derived from or with respect to the methods of the first to sixth aspects of the invention defined above.

Methods of filtering contaminants from a fluid are disclosed herein (see for example the first aspect above) in which, following the flow of feedstream fluid in one of said forward and said reverse flow directions, feedstream fluid is caused to flow through said filter element in the other one of said forward and said reverse flow directions, to remove contaminant material from a surface of the wall of the filter element. It will be understood, however, that it is within the range of possibilities of the invention that, following flow in the selected forward/reverse direction, flow in the other direction to remove contaminant material at least initially employs a fluid other than the feedstream fluid. For example, flow may initially employ a cleaning fluid, and then be changed over to feedstream fluid once it has been determined or estimated that the wall of the element has been adequately cleaned by flow in said other direction.

Embodiments of the present invention will now be described, by way of example only, with reference to the accompanying drawings, in which.

Figure 1:
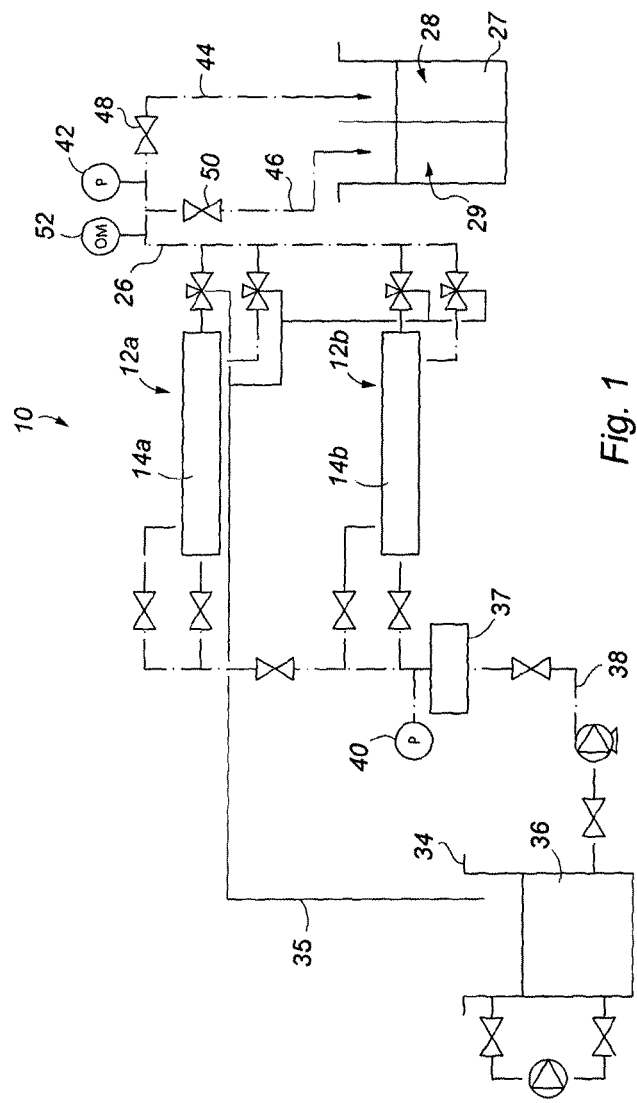
FIG. 1 is a schematic illustration of a filtration plant according to an embodiment of the present invention, the filtration plant having a utility in a method of filtering contaminants from a fluid which is also in accordance with an embodiment of the present invention.

Turning firstly to FIG. 1, there is shown a schematic illustration of a filtration plant according to an embodiment of the present invention, the plant indicated generally by reference numeral 10. The filtration plant 10 has a utility in a method of filtering contaminants from a fluid according to an embodiment of the present invention. The filtration plant 10 shown in FIG. 1 is a laboratory-scale pilot plant constructed to test the principles underlying the present invention. The plant 10 comprises at least one filter module 12 and, in the embodiment illustrated in FIG. 1, comprises two such filter modules 12a and 12b. As will be understood from a review of the remainder of this description, the filtration plant 10/method may employ any desired or suitable number of filter modules. The filter modules 12 are all of like construction and operation, and like components share the same reference numerals with the appropriate suffix "a", "b", etc. In the embodiment of FIG. 1, only the filter module 12a will be described in detail.

Figure 2:
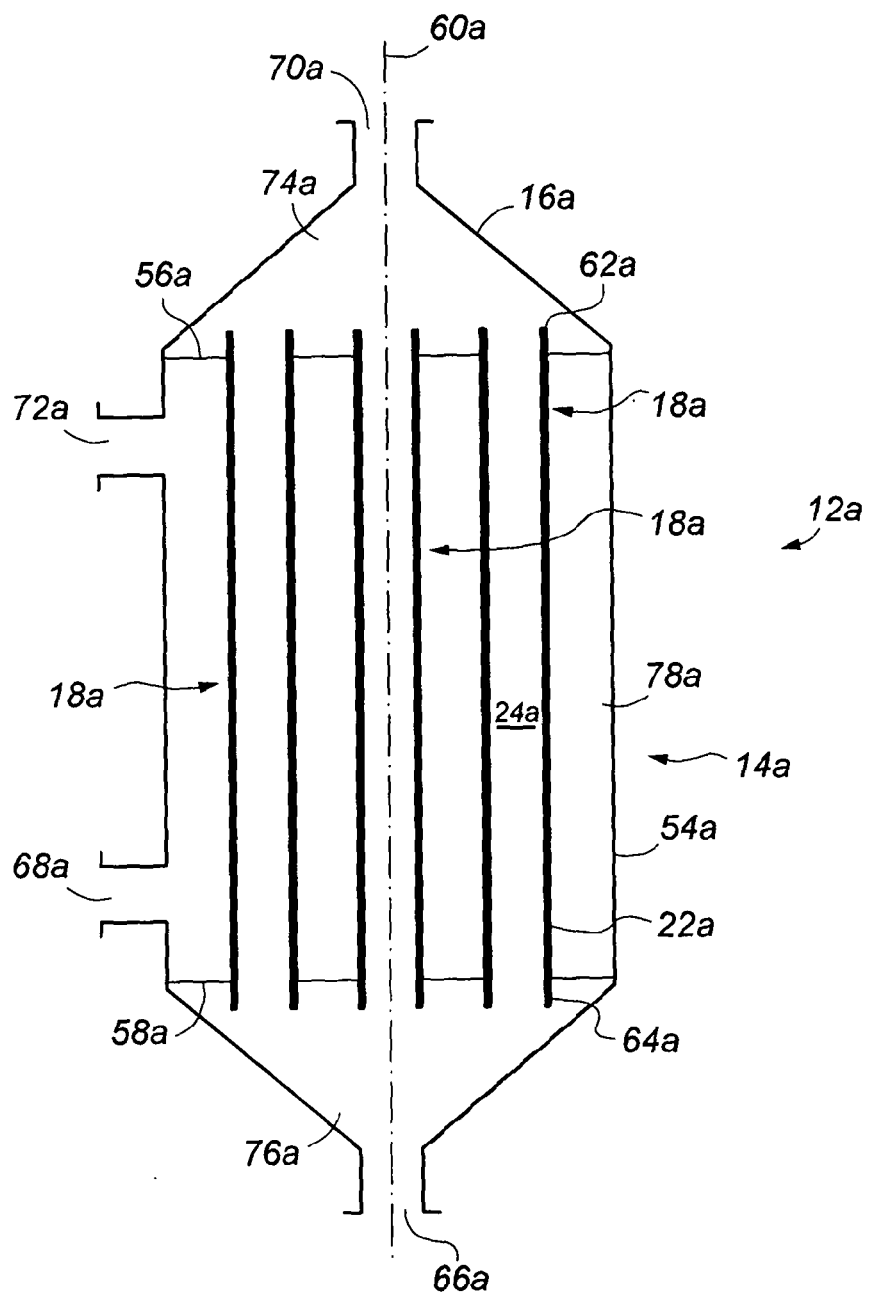
FIG. 2 is a schematic longitudinal cross-sectional view of a filter module according to an embodiment of the present invention, the filter module forming part of the filtration plant illustrated in FIG. 1.
Figure 3:
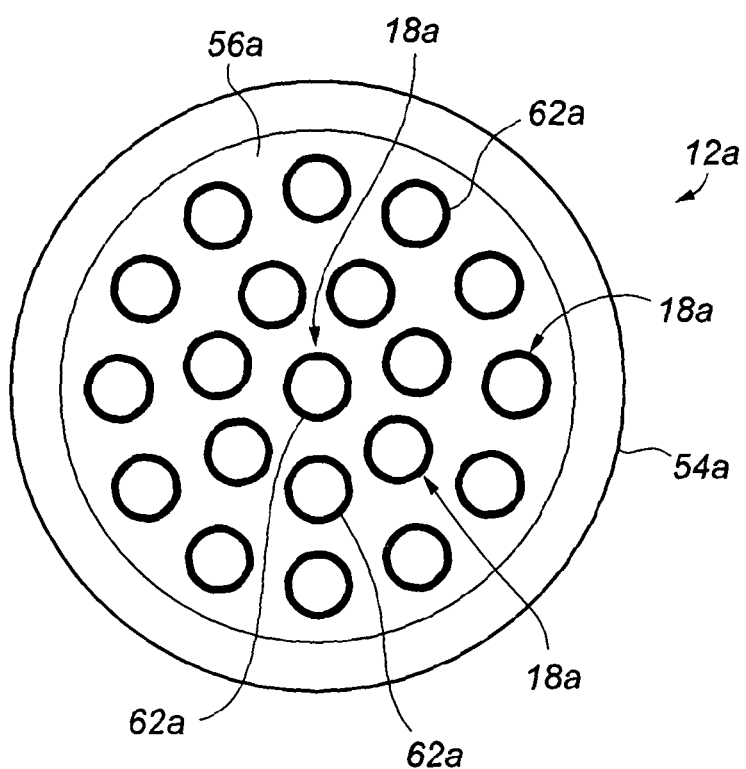
FIG. 3 is a schematic plan view of the filter module shown in FIG. 2, with an end cap of the module removed.
Figure 4:
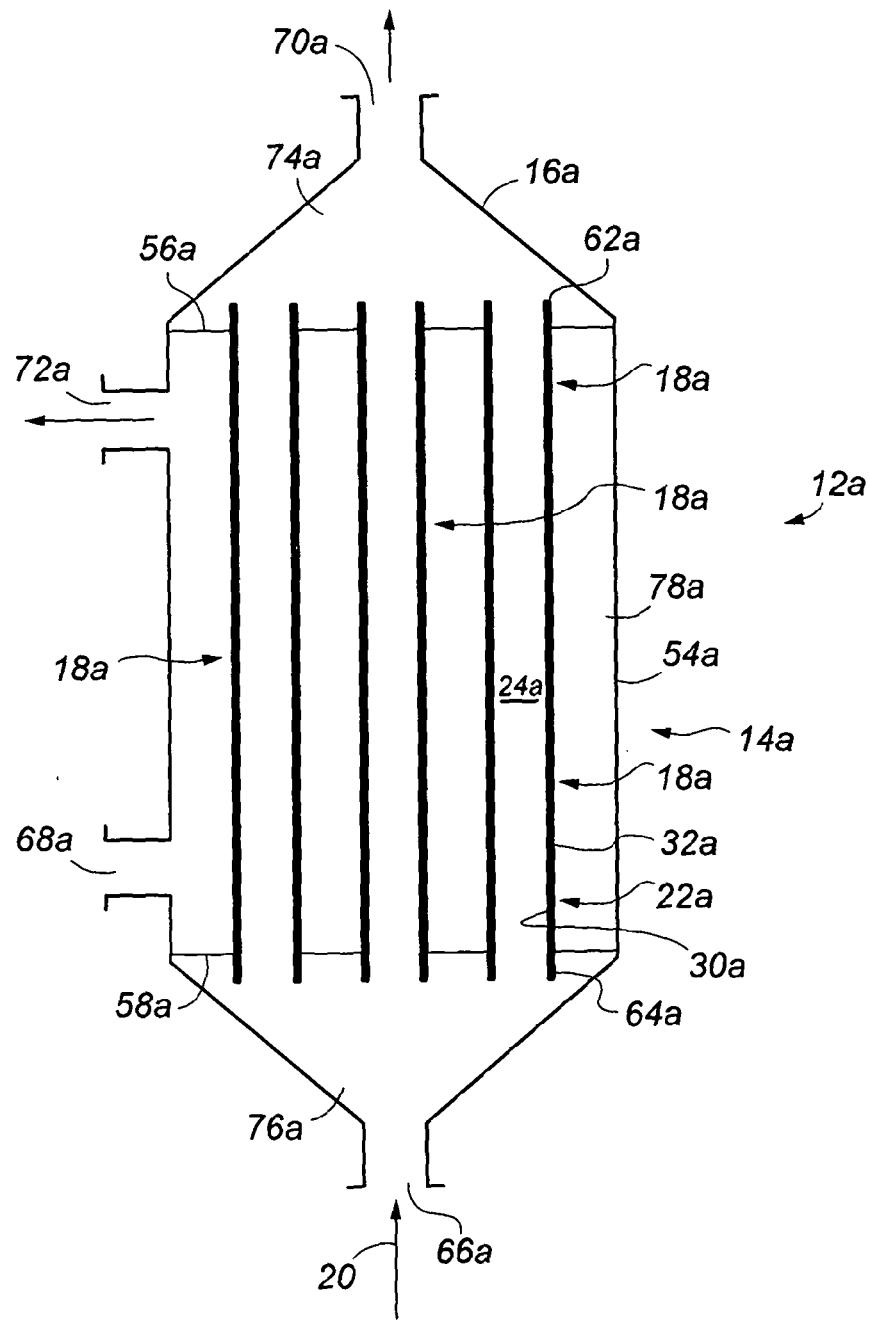
FIGS. 4 and 5 are views of the filter module shown in FIG. 2, illustrating different directions of flow of fluid through the module in the method of filtering contaminants of the invention.
Figure 5:
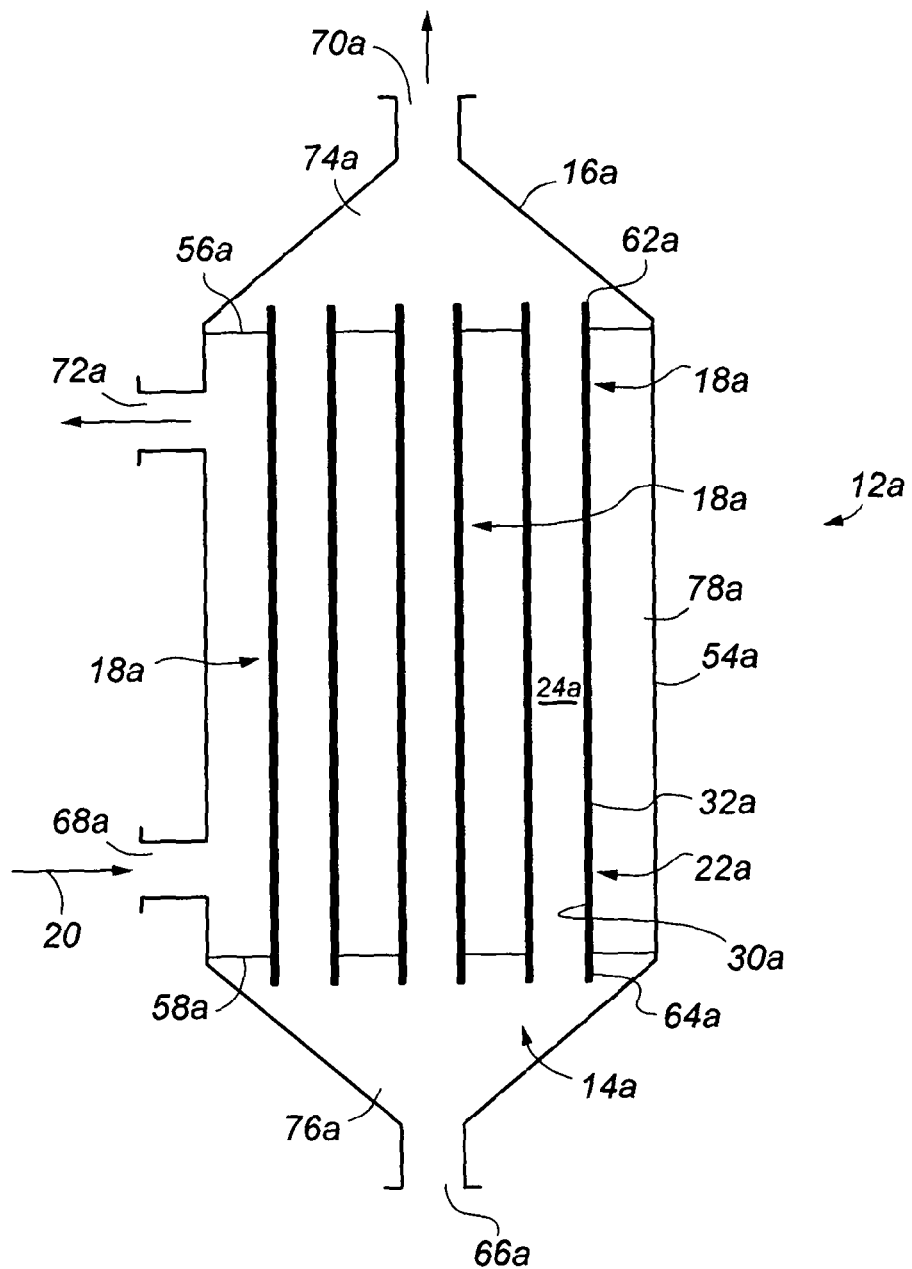

The filter module 12a is better shown in the longitudinal cross-sectional view of FIG. 2, and the plan view of FIG. 3, which shows the module with an end cap 16 removed. The filter module 12a comprises at least one filter element and, in the illustrated embodiment, comprises nineteen such filter elements 18a. In this embodiment, the filter elements 18a are hollow, but other shapes/configurations may be employed. Each filter element 18a is arranged to filter contaminants from a feedstream of a fluid directed into a filter chamber 14a defined by the filter module 12a. FIG. 4 illustrates the filter module 12a with feedstream fluid entering the filter chamber 14a, as shown by the arrow 20, the fluid passing in a forward flow direction through the filter module 12a. In the forward flow direction, the feedstream fluid passes through a wall 22a of each hollow filter element 18a from an inside 24a of each element to an outside of each element. The feedstream fluid can also be directed through the filter module 12a in a reverse flow direction, as shown in FIG. 5. In the reverse flow direction, the feedstream fluid enters the filter module 12a in the direction of the arrow 20 and passes through the walls 22a of each filter element 18a from the outside of each element to the inside 24a.

Contaminant materials are filtered out of the feedstream fluid during passage through the walls 22a of the hollow filter elements 18a, and the resulting filtrate is directed out of the filter module chamber 14a and into a filtrate flowline 26 (FIG. 1), for subsequent collection in a product tank 28. As can be seen in FIG. 1, the various filter modules 12a, 12b are arranged so that the filtrate flowing from the modules is directed into a common filtrate flowline 26 and thus to the product tank 28, or to an out-of-specification tank 29 (depending on the concentration of contaminants in the filtrate). The feedstream fluid entering the filter modules 12a contains contaminants which, as described above, may be or may comprise any one of a wide range of different materials. In particular, the feedstream fluid may be water and the contaminants may comprise hydrocarbon material, which may be oil, present in the feedstream fluid in the form of suspended droplets. The contaminants may additionally comprise granular rock materials such as sand. Alternatively, the feedstream fluid may be hydrocarbon or other material such as oil, and the contaminant may be or may comprise water. References herein to a contaminant or contaminants present in the feedstream fluid are to a material or materials present in the fluid and which it is desired to remove. The contaminant may be a different material from that of the fluid, and may be or may comprise a fluid and/or solids material.

In an aspect of the present invention, the method of filtering contaminants from the feedstream fluid comprises the following steps. The feedstream fluid containing the contaminants is directed into the filter chamber 14a and is arranged to flow in one of the forward and reverse flow directions described above. The filtrate is directed into the filtrate flowline 26 for collection. Subsequently, the feedstream fluid flow is switched, so that the fluid directed into the filter chamber 14a flows through the filter elements 18a in the other one of the forward and reverse flow directions. In this way, contaminant material which has built-up on a surface of the walls 22a of the filter elements 18a is removed during flow in said other direction. Following removal of the contaminant material by flow in said other direction, feedstream fluid is continued to be directed through the filter elements 18a in said other direction. Accordingly, contaminants in the feedstream fluid are filtered out by the hollow filter elements 18a during flow in said other direction. The filtrate resulting from this flow is directed into the filtrate flow line 26 for subsequent collection in the product tank 28. In contrast to prior methods, the method of this aspect of the invention therefore involves the active filtration of contaminants from the feedstream fluid when the fluid flows through the filter elements 18a in the opposite direction.

In more detail, and referring particularly to FIGS. 4 and 5, the method of the present invention proceeds as follows. Feedstream fluid will initially be directed into the filter chamber 14a to flow in the forward flow direction, passing through the walls 22a of the filter elements 18a from the inside 24a to the outside of the elements. The filtrate is directed out of the chamber 14a and then into the filtrate flowline 26 for collection. Flow from other filter modules, in particular the module 14b, will also typically be in the forward direction at start-up, although this may vary over time. In the forward flow direction, a "fouling-layer" of contaminant material builds-up on internal surfaces 30a of the filter element walls 22a. As will be explained below, it is specifically desired to promote formation of a fouling layer, which offers advantages over prior methods. However, the fouling layer will eventually build-up to an extent where the flux (the flow rate of fluid through the filter module 12a per unit volume) reduces to a level which is insufficient for efficient filtration to continue. Parameters of the method are measured during the filtration process and, when a change in a measured parameter indicative of the fouling layer building up to such an extent is detected, the flow of feedstream fluid is switched to the reverse direction of FIG. 5.

As described above, in the reverse flow direction, feedstream fluid entering the filter chamber 14a passes through the walls 22a of the filter elements 18a from the outside of the elements to the insides 24a. Passage of the feedstream fluid through the filter elements 18a in this direction removes at least some, typically a majority, of the contaminant material which has become adhered to the internal surfaces 30a of the filter element walls 22a. Following removal of said contaminant material by fluid flow in the reverse direction, the feedstream fluid is continued to be directed through the filter elements 18 in the reverse direction. Accordingly, it is not necessary to revert to flow in the forward direction following removal of the contaminants. Flow of feedstream fluid in the reverse direction can continue, with a fouling layer forming on external surfaces 32a of the filter element walls 22a. As will be described in more detail below, when the fouling layer has built up to a level sufficient to perform adequate filtration, the filtrate resulting from flow in said reverse direction passes into the filtrate flowline 26 for collection. Of course, flow may initially be in the reverse direction and switched to the forward direction if desired. Furthermore, the flow can be switched between the forward and reverse directions, as appropriate, any desired number of times. Subject to cleaning requirements which will be discussed below, the only significant downtime is the period when contaminant removal occurs, following switching, where the filtrate carrying the removed contaminants is collected for subsequent removal and/or re-direction back into a feed tank 34 (FIG. 1) containing the feedstream fluid 36.

Switching of the flow is typically carried out based upon measurement of the flux through the filter module 14a, utilising a flow meter 37. When the flux reduces to a predetermined level, the flow may be reversed. However, in addition or as an alternative to switching based upon measurement of the flux through the filter module 12a, switching of the flow may be performed based upon the monitoring of one or more other parameter. For example, the back-pressure of the feedstream fluid in a flowline 38 extending from the feed tank 34 to the filter module 12a may be monitored utilising a pressure gauge 40. An increase in the back-pressure is indicative of a fouling layer forming on the respective internal or external surfaces 30a/32a of the filter elements 18a (depending on the flow direction). An increase of the back pressure to a certain threshold level is indicative of the fouling layer building up to a sufficient extent that flow switching is required. The pressure of filtrate in the filtrate flowline 26 may similarly be monitored, using a pressure gauge 42. A reduction of the pressure of the filtrate in the filtrate flowline 26 to a threshold level may also be indicative that the fouling layer had built up to such an extent that flow switching is required. The contaminant concentration in the filtrate is also an important parameter which may be used for switching. An increase in the proportion of contaminant remaining in the filtrate may be indicative that flow switching is required.

The method may comprise taking at least one of the filter modules 12a, 12b offline for the purpose of the flow reversal cycle, with filtration through at least one further filter module continuing during this process. In this way, flow reversal cycles through all the modules can be carried out in a sequential manner.

As explained above, following switching, there is a period in which the filtrate exiting the chamber 14a carries the contaminant material removed from the filter elements 18a. This filtrate is referred to as being "out of spec." (specification), and is directed away from the filtrate into out-of specification tank 29. The out-of-specification filtrate may be routed back to the feed tank 34. A line 35 (FIG. 1) provides a path for routing the cross-flow bleed stream fluid from both modules 18a and 18b back to the tank 34.

Flow which is "in-spec" is directed into the tank 28. To this end, the filtrate flowline 26 splits into in-spec and out-of-spec flow lines 44 and 46, flow through these lines controlled by respective valves 48 and 50. The degree of contaminants (in this case hydrocarbons, typically oil) is monitored using an oil monitor 52. The valves 48 and 50 are actuated in response to the oil monitor reading. When the proportion of oil contaminants in the filtrate 27 in flowline 26, as measured by the oil monitor 52, has fallen to within the required specification range, the valves 48 and 50 can be actuated to direct the filtrate 27 into the in-spec line 44 and thus into the product tank 28.

A further option for switching of the direction of flow of the feedstream fluid 36 is to switch the flow on a timed basis. The time interval between the switching may be determined taking account of various parameters, including the proportion of contaminants in the feedstream fluid 36; the constituents of the contaminants; the average size of the contaminant materials (average droplet size for liquids and particle size for solids particles); dimensions and anticipated flux through the filter module 12a; input pressure and/or flow rate of the feedstream fluid 36; or indeed a combination of one or more of these or other suitable parameters. Furthermore, switching may be achieved based upon the first to occur of expiry of a predetermined time interval, or a predetermined change in a measured parameter, which may be selected from the above group. As mentioned above, the contaminant level may be an important parameter for switching the direction of flow.

The structure of the filter module 12a, and its use in the method of the first aspect of the invention, will now be described in more detail.

Referring again to FIGS. 2 to 5, the filter module 12a comprises a housing 54a which defines the filter chamber 14a. Each of the twenty filter elements 18a are positioned within the filter chamber 14a, and are supported by first and second end plates 56a and 58a. The filter elements 18a are elongate, and positioned substantially parallel to a main axis 60a of the filter module 12a. FIG. 3 shows first ends 62a of the filter elements 18a, which protrude from a plane of the first end plate 56a, and second ends 64a, which protrude from the second end plate 58a. In the open cylindrical membrane elements shown in FIGS. 2 to 5, a system of "O" ring seals (not shown) of suitable material is used to prevent leakage between the filter elements and the end plates 56a, 58a. The hollow filter elements 18a are typically porous membranes of a suitable material, in particular a ceramic material. However, other materials may be suitable. For example, the filter elements 18a may be of a plastics material, which might be a polymeric material. One advantage to the use of a ceramic material for the membranes 18a is that, in the event that pores of the filter elements become clogged with hydrocarbon deposits, the filter elements can be removed from the module 14a and placed in a kiln, to heat the filter elements and burn off the hydrocarbon deposits. The filter module 12a has two inlets 66a and 68a, and two outlets 70a and 72a. The filter chamber 14a is divided into end portions 74a and 76a, and a main central portion 78a. The inlet 66a opens onto the end portion 76a, and the outlet 70a opens onto the end portion. The inlet 68a and outlet 72a both open onto the main central portion 78a. As will be described below, in use, flow of fluid into and out of the filter modules through the respective inlets 66a/68a and out of the respective outlets 70a/72a is controlled using appropriate valves.

FIG. 4 shows the filter module 12a with fluid flowing in the forward direction. Feedstream fluid 36 containing contaminants is pumped into the filter module 12a through the inlet 66a, as indicated by the arrow 20 in FIG. 4. The second inlet 68a is closed. Primary flow of fluid out of the filter module 12a is through the outlet 72a, with a smaller volume cross-flow bleed exiting the module through the outlet 70a. Valves control the proportion of flow through the outlets 72a and 70a and, in the forward flow direction, typically at least 90% of fluid flow is through the outlet 72a. The feedstream fluid 36 enters the end portion 76a of the filter chamber 14a, and flows into the central voids 24a of the hollow filter elements 18a. As the proportion of fluid in the cross-flow bleedstream is only up to around 10% of the volume of the fluid entering the filter module, the majority (at least around 90%) of the fluid flows radially outwardly, through the walls 22a of the filter elements 18a.

During passage through the filter element walls 22a, contaminant materials are filtered out from the feedstream fluid 20. Initially, and until such time as a fouling layer builds-up on the internal surfaces 30a of the filter elements 18a, contaminant filtration will be determined by the pore size of the material forming the filter elements 18a. In other words, the minimum dimension of contaminants that will be filtered out will be determined by the pore size. This initial filtrate will be directed into the out of spec line 46. As the fouling layer builds-up, however, contaminants of smaller dimensions will be filtered out and directed into the in spec line 44. The filtrate flows into the main central portion 78a of the filter chamber, which is generally referred to as the "annulus". This is the space between the elements 18a, and between the elements 18a and the housing 54a. The filtrate flow from the various filter elements 18a is thus combined in the annulus 78a, and exits the filter module 12a through the outlet 72a. The cross-flow bleedstream however passes through the central voids 24a of the filter elements 18a, and flows out of the upper ends 62a of the filter elements into the chamber end portion 74a. The bleedstreams from the various filter elements 18a are thus combined, and pass out of the filter module 12a through the outlet 70a.

Fluid flow through the module 12a in the reverse flow direction is illustrated in FIG. 5. In this case, the feedstream fluid 36 is directed into the filter module 12a through the inlet 68a, as indicated by the arrow 20, and the inlet 66a is closed. The valves controlling flow through the outlets 70a and 72a are arranged so that the primary flow of fluid (at least about 90%) from the filter module 12a is through the outlet 70a whilst the cross-flow bleed (up to around 10%) is through the outlet 72a. Feedstream fluid 20 is thus directed into the annulus 78a and, as primary flow is through the outlet 70a, the feedstream fluid flows through the walls 22a of the various filter elements 18a and into the central voids 24a. As for the forward flow direction, initial filtration is determined by the pore size of the filter elements, until such time as a fouling layer builds-up on the external surfaces 32a of the filter elements 18a. The filtrate flows on through the central voids 24a and into the chamber end portion 74a, where the filtrate flow is combined and flows on out of the filter module 12a through the outlet 70a. Fluid flowing in the cross-flow bleedstream passes through the annulus 78a, and exits the filter module 12a through the outlet 72a. Fluid flow is switched between the forward and reverse flow directions as and when required, as will be described in more detail below.

In prior cross-flow processes and systems of the type described above, it has been a specific aim to avoid the formation of a fouling layer on the filter elements. Accordingly, in the prior processes/systems, a cross-flow bleedstream has typically been directed across the filter elements at a relatively high velocity. In the present invention, the inventors have recognised that the formation of a fouling layer can be beneficial to the effective filtration of contaminants. In particular, the pore size of the filter elements 18a can be made relatively large, in fact larger than the dimensions of the droplets/particles that it is desired to filter from the feedstream. This provides a relatively higher flux through the filter module 12a. The formation of a fouling layer will also effectively result in the filtration of droplets/particles from the feedstream fluid 36 which are of a smaller dimension than the pore size of the filter elements 18a. In an aspect of the present invention, the formation of a fouling layer is promoted by directing fluid in the cross-flow bleedstream at a velocity of no more than about 4 m/s. This applies particularly to aqueous fluids. In addition to the specific factors that are quantified (velocity, Reynolds No. etc.), general flow conditions may be used (including velocity and level of turbulence) to promote the formation of a fouling layer and to inhibit the removal of the fouling layer. Similarly, in the prior processes and systems, it was specifically desired to arrange the fluid flowing in the cross-flow bleedstream to flow with a turbulent flow profile, to inhibit the formation of a fouling layer. The inventors have recognised that it is beneficial to arrange the cross-flow bleedstream through the filter elements 18a to flow with a laminar flow profile, as this promotes the formation of a fouling layer. At least for aqueous fluids, this may be achieved by arranging the fluid to flow in the cross-flow bleedstream such that it has a Reynolds number of no more than about 2500.

Further, in prior processes and systems, it was specifically desired to maintain the cross-flow bleedstream at as low a proportion as possible of the total volume of fluid in the feedstream (less than 5%, and typically around 1%). The purpose of this was to maximise flow through the filter element and thus throughput. The inventors have recognised that the direction of a relatively greater proportion of feedstream fluid 36 along the cross-flow bleedstream across the filter elements 18a, typically at least about 5% of the total volume of fluid in the feedstream, is beneficial. In particular, this provides greater freedom to "tune" the filtration process to suit particular requirements of the method than would be the case with prior processes and systems. For example, this may provide a greater ability to tune the method to take account of variations in fluid properties; dimensions and flow through the filter module 12a; and/or properties of the contaminants such as viscosity and particle size.

Further, in prior processes and systems, filter elements comprising a relatively small pore size, typically in the range of 0.2 to 4 microns, and often 0.2 microns, have been utilised. Filtration was by size-exclusion, the separated droplets/particles having larger sizes than the pore size of the filter elements. Further and as discussed above, it was specifically taught that the formation of a fouling layer should be avoided. The inventors have recognised that formation of a fouling layer enables filter elements 18a to be employed having larger pore sizes, leading to a greater flux through the filter module 12a. A suitable pore size of no less than about 4 microns has been identified as being particularly beneficial. The method employing such filter elements 18a involves controlling one or more parameter of the cross-flow bleedstream across the filter elements 18a to promote the promotion of a fouling layer. In this way, filtering of contaminant material is achieved by a combination of the filter element itself (determined by pore size) and the fouling layer.

Figure 6:
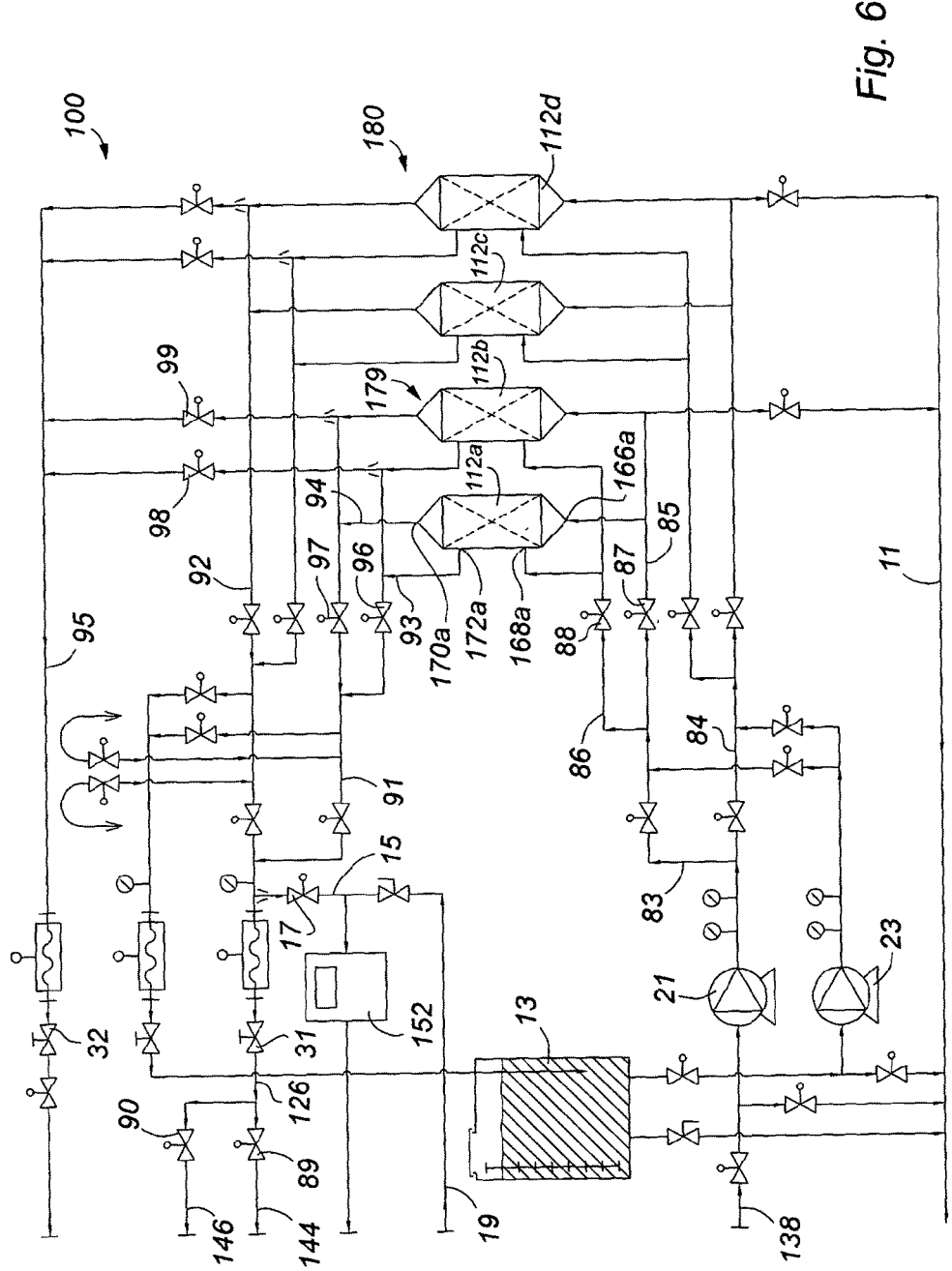
FIG. 6 is a block diagram illustrating the flow paths and operation of a filtration plant in accordance with another embodiment of the present invention.

Turning now to FIG. 6, there is shown a block diagram illustrating operation of a filtration plant 100 in accordance with another embodiment of the present invention. The filtration plant 100 is a demonstration plant, constructed and operated according to the principles described above in relation to the pilot plant 10 of FIG. 1, based upon test results derived from the pilot plant 10 (which will be discussed below). Like components of the demonstration plant 100 with the pilot plant 10 of FIGS. 1 to 5 share the same reference numerals, incremented by 100.

In this instance, the demonstration plant 100 comprises two arrays 179, 180 of filter modules 112, each array comprising two modules. The modules are given the reference numerals 112 with the addition of the suffixes "a" to "d", respectively. Only the first array 179 will be described in detail herein.

In this instance, a feedstream flowline 138 supplies feedstream fluid containing contaminants to both of the arrays 179 and 180. Branches 83 and 84 communicate with the feedstream flowline 138, for supplying fluid to the respective arrays 179, 180. The branch 83 splits into forward and reverse feed lines 85 and 86, for supplying feedstream fluid into the modules 112a and 112b depending on the desired flow direction. Flow through the desired feedline 85, 86 is controlled by respective valves 87 and 88. Inlets 166a, 168a and outlets 170a, 172a of the filter module 112a are shown. The plant 100 also comprises a filtrate flowline 126, which provides a common outlet for filtrate from both of the arrays 79, 80. The filtrate flowline 126 branches into in-spec 144 and out-of-spec 146 lines. Flow to the in spec or out of spec line 144, 146 is controlled by valves 89 and 90. Filtrate branches 91 and 92 supply fluid from the arrays 179, 180 respectively into the filtrate flowline 126.

Again, considering just the array 179, and in particular the module 112a, outlet lines 93 and 94 direct filtrate into the branch 91 and thus on into the flowline 126, depending upon whether flow is in the forward or reverse direction. The outlet lines 93 and 94 can also communicate with a dilution bleedline 95, which receives the cross-flow bleed. Flow of fluid into the filtrate flowline 126 or the dilution bleedline 95 is controlled by valve pairs 96, 97 and 98, 99.

Operation of the filtration plant 100, in particular the filter module 112a of the array 179, is as follows. In the forward flow direction, valve 88 is closed and valve 87 is open, so that feedstream fluid is directed from the branch 83 and into the forward feedline 85. The feedstream fluid thus enters the filter module 112a through the inlet 166a and flows through filter elements (not shown) contained with filter chamber 114a. Filtrate exits the filter chamber 114a through the outlet 172a, and passes into the outlet line 93. A cross-flow bleed across the filter elements exits the filter chamber 141a through the outlet 170a and flows into the outlet line 94. The flow through the outlets 170a (of the cross-flow bleed) and 172a (of the filtrate) is controlled by the valves 96 to 99. Specifically, in forward flow, the valve 96 is open and the valve 97 closed. In this way, filtrate exiting the filter chamber 114a through the outlet 172a flows into the outlet line 93, through valve 96 and ultimately into the filtrate flow line 126. The valve 98 is closed and the valve 99 open, so that cross-flow bleed fluid in the outlet line 94 flows into the dilution bleed line 95. The proportion of filtrate and cross-flow bleed is metered by controlling the positions of valves 31 and 32. Alternatively the proportion of filtrate and cross-flow bleed can be metered by controlling the actuation position of valve elements (not shown) of the valves 96 and 99.

In the reverse flow direction, valve 87 is closed and valve 86 open, so that feedstream fluid enters the chamber 114a through the inlet 168a. Filtrate then exits the chamber 114a through the outlet 170a, and the cross-flow bleed exits the chamber through the outlet 172a. Valve 96 is now closed and valve 97 open, so that the filtrate passes from the outlet line 94 and on into the filtrate flow line 126. The valve 99 is closed and the valve 98 open, so that the cross-flow bleed is directed into the dilution bleed line 95 through the valve 98. There is a dump cycle for flow in both the forward and reverse flow directions. In the first stage after flow reversal, the fluid is passed to the out-of-spec line 46. Following continued flow in said direction and the formation of a fouling layer, filtrate 27 is directed to the in-spec line 44, determined according to the measured parameter (or time-period).

The filtration plant 100 also comprises a drain line 11. When required, cleaning-in-place (CIP) of the filter elements of the various modules 112 can be carried out, utilising a cleaning fluid with suitable chemical additives. A CIP tank 13 contains the cleaning fluid, which can be pumped into the various filter modules 112 when required. An oil concentration monitor (OCM) 152 is provided, which communicates with the filtrate flow line 126 via an OCM line 15 and valve 17. A clean water calibration input line 19 is provided for supplying clean water, for calibration purposes. A primary pump 21 supplies feedstream fluid to the arrays 179 and 180. A secondary pump 23 communicates with the CIP tank 13, and supplies cleaning fluid to the arrays 79, 80 when required. The CIP operation may be performed with the cleaning fluid flow in the forward and the reverse flow directions. It will be appreciated that various other valves are provided for controlling fluid flow through the filtration plant 100, depending upon whether flow is in the forward or reverse direction; whether CIP is being performed; and/or for performing other desired steps in the filtration process. Such valves will not be described herein in detail, but are shown in the block diagram. The skilled person will readily understand how the various valves are operated to control flow.

Figure 7:
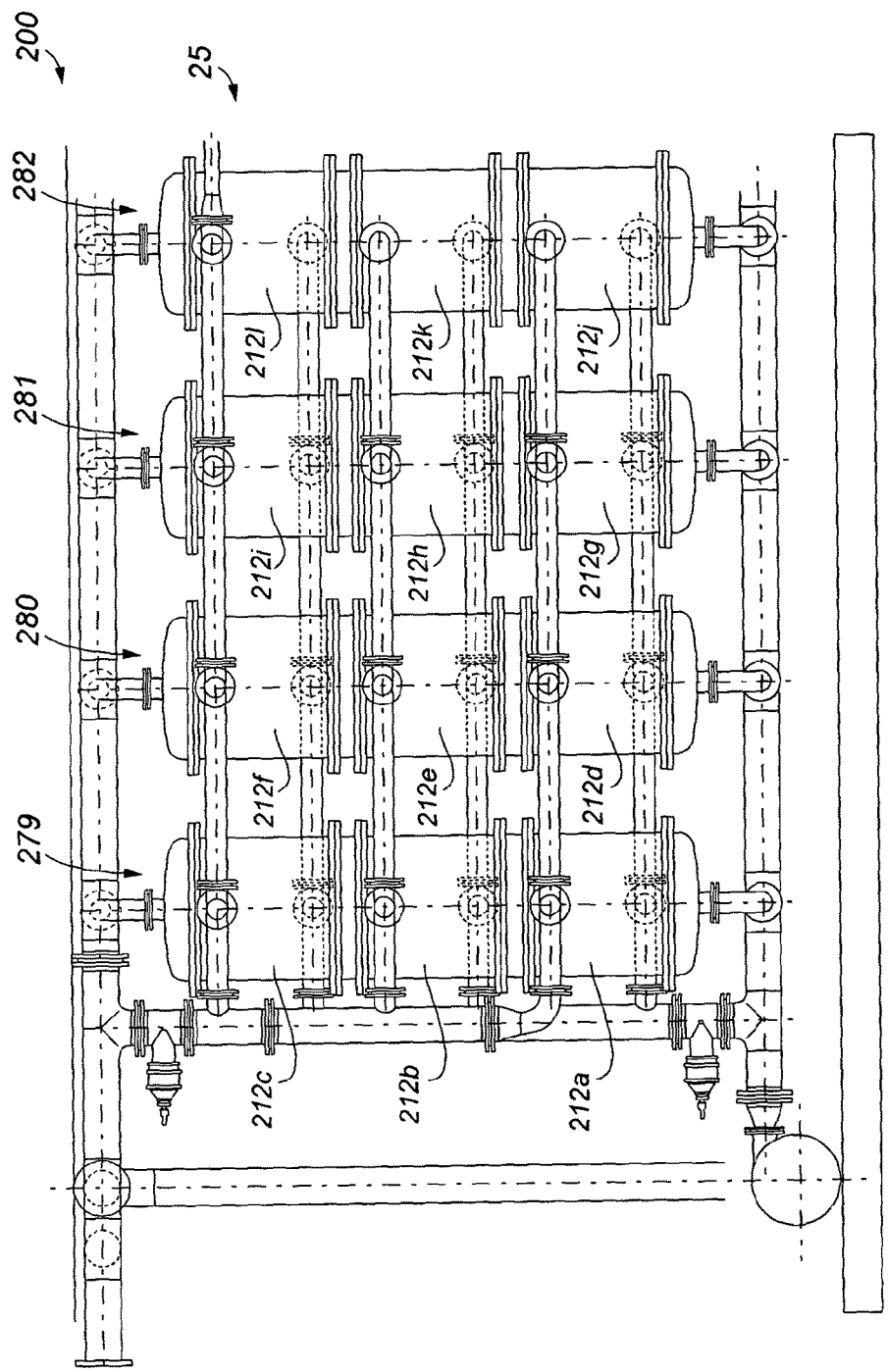
FIGS. 7, 8 and 9 are front, plan and end views, respectively, of part of a filtration plant in accordance with another embodiment of the present invention.
Figure 8:
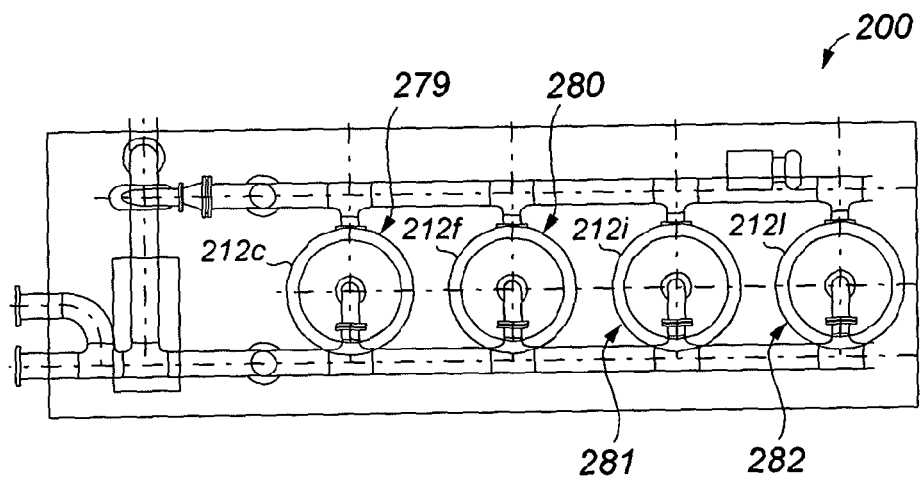
Figure 9:
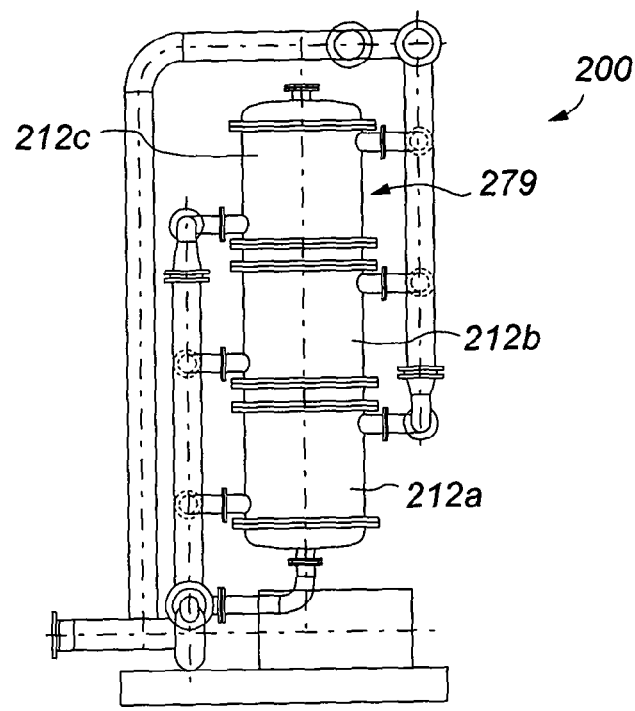

Turning now to FIGS. 7, 8 and 9, there are shown front, plan and end views, respectively, of a part of a full scale filtration plant 200 in accordance with another embodiment of the present invention. The filtration plant 200 is constructed and operated according to the principles described above in relation to the pilot and demonstration plants 10, 100 of FIGS. 1 and 6, based upon test results derived from the pilot and demonstration plants (which will be discussed below). Like components of the plant 200 with the plant 10 of FIG. 1 and the plant 100 of FIG. 6 share the same reference numerals, incremented by 200 and 100, respectively.

A unit 25 of the filtration plant 200 is shown, and comprises four arrays 279, 280, 281 and 282 of filter modules, each array comprising three filter modules 212. In this embodiment, each filter module 212 includes twenty filter elements (not shown). The filter modules 212 are given the suffixes a to l, as appropriate. The filtration plant is modular and may comprise any desired number of such units 25. In order to reduce the plant 200 footprint, the modules 212 may be stacked vertically, in larger plants. The full-scale plant 200 is modular, consisting of standard skid-mounted units 25, each containing twelve membrane modules 212, and with a capacity of between 300 and 1500 m$^3$/h, depending on the required final oil level, the type of membrane installed, the feed stream composition and other process variables. The general arrangement for a twelve-module unit 25 is shown in the Figures. The footprint, in the illustrated embodiment, is around 2.5 m×8.5 m if the modules 212 are stacked as shown, to give a height of around 5.8 m. A plant designed for a capacity of 1200 m$^3$/h would, for example, contain three or four such standard units 25. Four units 25 would be required for a conservative design, with the lowest flux from the demonstration plant measurements, to give an oil level of less than 10 mg/l.

Figure 10:
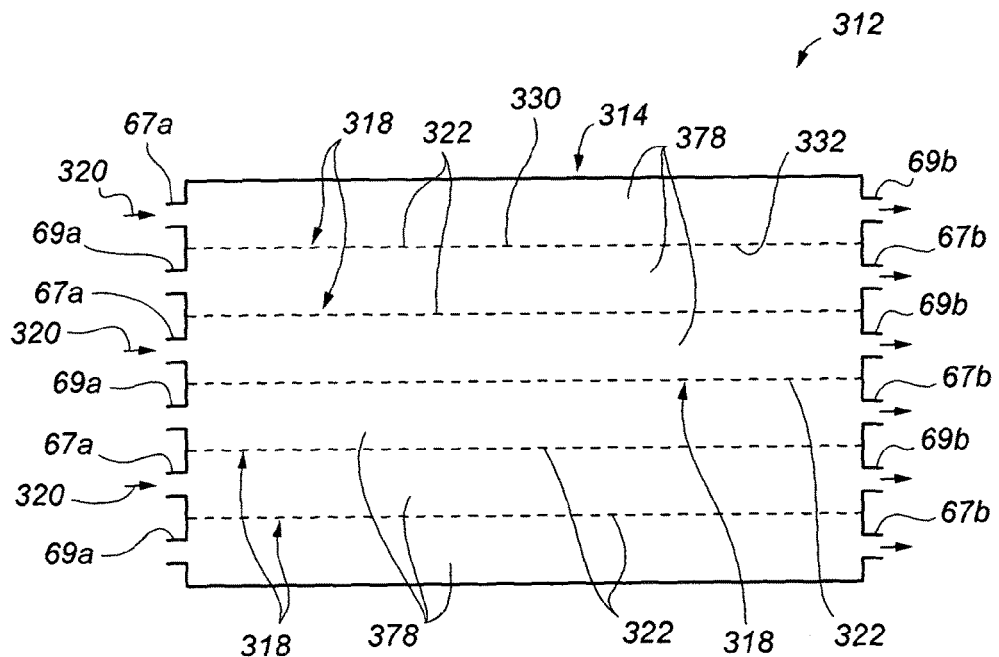
FIGS. 10 and 11 are schematic longitudinal cross-sectional views of a filter module according to another embodiment of the present invention, the filter module forming part of filtration plant such as the plant illustrated in FIG. 1, the drawings illustrating different directions of flow of fluid through the module in the method of filtering contaminants of the invention.
Figure 11:
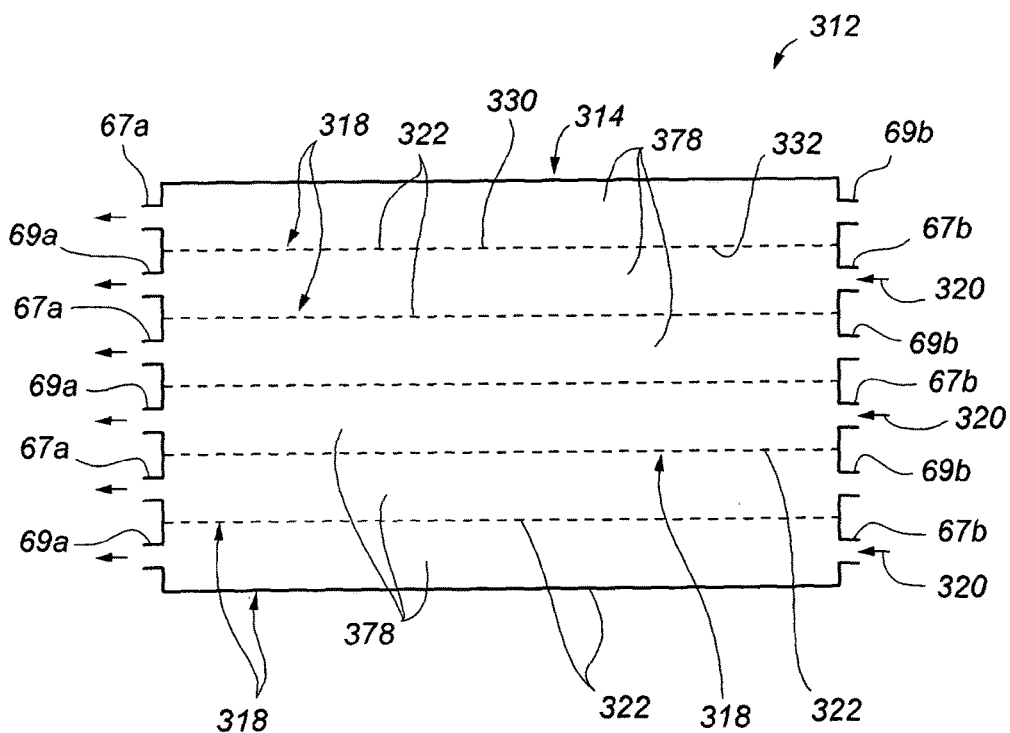

Turning now to FIGS. 10 and 11, there are shown schematic longitudinal cross-sectional views of a filter module according to another embodiment of the present invention, the filter module indicated generally by reference numeral 312. The filter module forms part of a filtration plant (not shown), such as the plant illustrated in FIG. 1, where a number of the modules 312 would be provided in place of the modules 12. Like components of the module 312 with the module 12 of FIGS. 1 to 5 share the same reference numerals, incremented by 300.

FIGS. 10 and 11 illustrate different directions of flow of fluid through the module 312 in a method of filtering contaminants of the invention, FIG. 10 showing a forward flow direction and FIG. 11 a reverse flow direction. The filter module 312 comprises at least one filter element and, in the illustrated embodiment, comprises five such filter elements 318. In this embodiment, the filter elements 318 are in the form of generally flat plates. The module 312 defines a filter chamber 314 containing the filter elements 318, and has a number of primary flow ports 67a and 67b, which can be arranged to direct feedstream fluid into the chamber 314 or filtrate out of the chamber, as will be described below. The module 312 also has a number of secondary flow ports 69a and 69b which can be closed, or opened to allow a bleed stream flow.

As can be seen from the Figure, the filter elements 318 are arranged so that they define a number of flow channels 378, which are for the flow of bleed fluid through the chamber 314, as will be described below.

In the forward flow direction of FIG. 10, feedstream fluid 320 is directed into the chamber 314 through the primary flow ports 67a. The feedstream fluid 320 passes through walls 322 of each filter element 318 towards a primary flow port 67b, so that contaminants are filtered out during passage through the filter elements 318.

The flow through the walls of the filter elements 318 can be in upward or downward directions in the drawing, i.e. through both filter elements defining the channel into which the feed flows from each of the ports 67a.

The filtrate exits the filter chamber 314 through the primary flow ports 67b. Whilst reference is made to upward/downward flow of the filtrate 320, it will be understood that this will depend upon the orientation of the filter module 312. During flow in the forward direction, the secondary outlets 69b are opened (or partially opened, as appropriate) to permit a proportion of the feedstream fluid 320 to flow in a cross-flow bleed stream through the passages 378. As above, the proportion is controlled to promote the formation of a fouling layer. The secondary outlets 69a are closed at this time.

The feedstream fluid 320 can also be directed through the filter module 312 in a reverse flow direction, as shown in FIG. 11. As above, this may be desired to clear fouling layers which have formed on first or upper surfaces 330 of the filter elements 312 during flow in the forward direction. In the reverse flow direction, feedstream fluid 320 is directed into the chamber 314 through the primary flow ports 67b. The feedstream fluid 320 passes through the walls 322 of each filter element 318 in upward or downward directions in the drawing, towards a primary flow port 67a, so that contaminants are filtered out during passage through the filter elements 318. The filtrate exits the filter chamber 314 through the primary flow ports 67a. Again, whilst reference is made to upward/downward flow of the filtrate 320, it will be understood that this will depend upon the orientation of the filter module 312. During flow in the reverse direction, the secondary outlets 69a are opened (or partially opened, as appropriate) to permit a proportion of the feedstream fluid 320 to flow in a cross-flow bleed stream through the passages 378. Once again, the proportion is controlled to promote the formation of a fouling layer. The secondary outlets 69b are closed at this time.

From the above, it will be understood that the channels 378 are alternately bleed and filtrate channels. In FIG. 10, the channels 378 exiting to ports 69b are bleed channels whilst the channels 378 exiting to ports 67b are filtrate channels. In FIG. 11, the channels 378 exiting to ports 69a are bleed channels whilst the channels 378 exiting to ports 67a are filtrate channels.

When required, flow can be switched back to the forward flow direction to clear the fouling layers formed on second or lower surfaces 332 of the filter elements 312 during flow in the reverse direction. Further switching can be carried out as required following the principles described above in relation to FIGS. 1 to 9, and a dump cycle performed.

General observations on construction and operation of the pilot, demonstration and full scale plants 10, 100 and 200 will now be discussed.

In the plants 10, 100 and 200, the separation of oil and fines from feedstream water is achieved by passing the water through the wall of a ceramic membrane element (e.g. an open cylinder). All of the feedstream water may be passed through the wall of the membrane element, in a dead-end filtration process. However, the membrane element may be partially constricted at one end so that most of the water flows through the walls, and some flows in a cross-flow bleed stream. It may be preferable to direct at least 5%, optionally between 5% and 10% or more, of the feedstream water in a cross-flow bleed stream. A set of membrane elements is mounted in a module (typically of nineteen or twenty membranes, but this can vary according to the particular design). The module is configured so that the water flows in one of two directions (controlled by appropriate valves). In the first (forward) direction of flow, water entering the module flows into the central voids of the cylindrical elements, through the walls, and out into the annulus of each element. The flows in the annuli of the elements are combined within the module, and pass out of the module as the "filtrate" stream. This is the feed water from which the oils and fines have been removed (filtered) by the walls of the elements. It should be noted however that the fouling layer may penetrate into the surface layers to some degree, such that the filtration effect is not only a surface effect.

A small proportion of the feed water to each element (generally from above zero to 10%, but higher than 10% is some cases) may be arranged so that it does not pass through the walls, but passes straight through the central void and out of the element. This is the "cross-flow bleed" through the membrane element. The cross-flow bleed streams from each element are collected and combined within the module and pass out of the module as a stream called the "concentrate". The oil and fines that are separated from the water by the membrane elements are collected in the concentrate stream, at a much higher concentration than in the feed stream to the module.

In the second (reverse) flow direction, water entering the module flows into the annuli around the membrane elements, through the walls of the elements, and into the central voids. The streams from the central voids are combined and pass out of the module as the filtrate stream for the reverse direction of flow. A small proportion of the water (0.5-10%) may be arranged so that it does not pass through the walls but passes through the annuli of the elements. This is the cross-flow bleed for the reverse direction of flow. The cross-flow bleeds are combined within the module and pass out of the module as the concentrate stream for the reverse direction of flow.

The pore size of the membrane element is typically 1 to 30 microns (test work has been carried out using 15 micron membrane elements), and is preferably at least about 4 microns. The pore size can be larger than the sizes of the oil droplets and fines that are removed (for example, droplets and fines that are 1 micron in size can be removed by elements with a pore size of 15 microns). Filtration is achieved by two mechanisms: (1) physical rejection of droplets and fines that are larger in size than the membrane pores; (2) the formation of a fouling layer on the membrane surface, which causes the rejection of droplets and fines than are smaller than the pore size.

The direction of flow of the feed stream into the module is changed sequentially between the forward and reverse directions. Treatment is achieved through the following sequence: the feed water enters the module which is set for forward flow. As the water passes through the membrane elements, a "fouling" layer of oil and fines builds up on the surface of the membrane wall. The fouling layer forms regardless of the size of the droplets and fines, even when the sizes are smaller than the pore size of the membrane. It is not necessary for fines to be present in the feed; oil alone will form the layer. Filtration of droplets/fines larger in size than the membrane pores takes place immediately. Filtration of droplets/fines that are smaller than the pore size takes place when the fouling layer has formed.

The filtrate is monitored and is automatically passed to an "out-of-specification" discharge stream until the fouling layer forms and gives the required degree of treatment. The out-of-specification stream is usually routed back to the feed supply. When the fouling layer builds up sufficiently so that the required treatment is achieved, the filtrate is passed to the "in-specification" discharge. The time for the fouling layer to build up is typically between 5 seconds and 2 minutes. The required degree of treatment is usually defined in terms of the suspended (dispersed) oil level in the filtrate, which is measured automatically; but the treatment requirement may be defined in other ways according to the application, such as the concentrations of fines or of specified components in the filtrate. Filtration then continues in the forward flow direction. The filtrate is discharged through the in-specification line (the discharge for the treated water).

The cross-flow bleed stream (concentrate stream) is usually returned to the feed supply, but may be separated to recover the oil. As filtration proceeds, the flow rate through the membrane (the "flux") usually declines as the fouling layer becomes thicker. When the flux falls to a pre-determined value or after a pre-determined time interval, the direction of flow is changed from forward to reverse. When the flow is reversed the fouling layer on the membrane wall is removed by the reversed flow of water, and is flushed from the module during a "dump cycle". In this cycle the filtrate stream for the reversed direction of flow is passed to the out-of-specification discharge. The duration of the dump cycle is typically between 5 seconds and 10 minutes, depending on the properties of the feed water.

During the dump cycle a new fouling layer forms on the outer wall (annulus side) of the membrane element. Reverse filtration continues after the dump cycle. When the fouling layer has built up sufficiently to achieve the required degree of treatment (which may be during the dump cycle or during a period after the dump cycle), the filtrate flow is switched from the out-of-specification to the in-specification discharge. Treatment in reverse-filtration mode continues for a pre-determined period of time or until the flux in reverse flow falls to a pre-determined value. The flow direction is then changed back to forward flow, and the sequence of events described above is repeated. Filtration then continues with automatic sequential reversal between the forward and reverse flow directions.

After the plant has operated with several forward and reverse cycles, in some cases the flux does not return to an acceptable value after the reversal in flow direction. If this occurs, an automatic cleaning-in-place (CIP) operation is performed. The module is taken off line and subjected to one of more forward and reverse cycles using a cleaning fluid instead of the feed water (the cleaning fluid may be clean water, or a detergent or caustic solution or a portion of the treated filtrate). The purpose of this is to remove the fouling layers on the inner and outer surfaces of the membrane elements, which in time may not be completely removed by the dump cycles in the forward and reverse directions. The CIP operation restores the flux to an acceptable value. Individual modules are usually taken off-line sequentially for CIP, so that the other modules continue processing the feed water; there is therefore no interruption to the treatment. The degree of treatment, the filtrate flow rate and concentrate flow rates and the frequency of CIP are determined by the following operating parameters: the selected type of membrane element (pore size); the duration of the forward, reverse and dump cycles, the cross-flow bleed flow rate and the trans-membrane pressure (i.e. the pressure drop across the membrane elements). The process is optimised by adjusting these parameters for each type of feed water. The process has been developed using ceramic membranes supplied of a particular manufacturer, but the principles are independent of the particular manufacturer's membrane. The process has a particular utility in the field of the oil & gas exploration and production industry, but could be extended to include treatment of water or other types of fluid in different industries. Significant features of the process are as follows.

Filtration by the membrane elements in both the forward and reverse flow directions (filtration by outward flow from the void, and inward flow from the annulus).

Filtration by the combined effects of the pore size (for the separation of larger droplets/particles) and the formation of a reversible fouling layer for the removal of droplets and fines with smaller sizes than that of the membrane pore.

Sequential reversal of the flow direction to periodically remove the fouling layer, and therefore maintain a high overall flux. This is an improvement compared with conventional "dead-end" filtration processes, where the filtration system is taken offline for flushing or where disposable filters are used.

The use of a cross-flow bleed stream, at a low flow rate, which controls the concentration of oil/fines in the membrane modules (in the void or annulus for the forward and reverse directions, respectively).

Control of the oil level in the concentrate improves the filtration efficiency; if the concentration is allowed to increase to too high a value, then the oil level in the filtrate increases.

The use of a low cross-flow bleed flow rate, so that the cross-flow velocity is not so high as to prevent the formation of the fouling layer. The low cross-flow rate also reduces the pump size and this reduces the operating cost of the process compared with conventional cross-flow filtration processes. In cross-flow microfiltration, the flow rate (cross-flow velocity) is high because the principle of the process is to prevent the formation of a fouling layer (since these are size-exclusion filtration processes). The process of the invention facilitates the use of membranes with pore sizes larger than the sizes of the droplets and fines that can be removed. This gives the following benefits.

The flux is high compared with filtration processes that are based on size exclusion such as cross-flow microfiltration (i.e. pores smaller than the droplets particles that are removed). The flux in cross-flow microfiltration is typically 200-400 $l/m^2/h$, compared with 800-2000 $l/m^2/h$ for the process of the present invention. The process therefore has a smaller membrane area for a given capacity (filtration rate), so the plant cost and plant size are reduced.

Since the membrane pores are larger than the size of the sub-micron and micron size solid particles (fines) this prevents irreversible fouling of the membrane (particularly fouling within the membrane matrix, as opposed to the surface fouling layer). Irreversible fouling could not be removed by the flow reversal or CIP operations. Irreversible fouling is a problem with other filtration processes that do not make use of a fouling layer (such as cross-flow microfiltration).

The use of sequential flow reversal to regenerate the membranes (remove the fouling layer) means that the processing is continuous, with only a short interruption during the dump cycle.

The sequential CIP operation, taking modules off-line in sequence, enables processing to proceed without interruption.

The use of ceramic membranes for the system instead of conventional polymer membranes makes the process resistant to irreversible fouling by high levels of oil. For example, the ceramic membranes can be restored by the normal CIP operation if neat crude oil enters the plant. However the principle of operation of the process and the associated benefits are the same for polymer membrane systems, in cases where irreversible fouling by oil is not a risk.

Test Results—Background

The laboratory-scale pilot plant 10 was constructed according to the principles outlined above in relation to FIGS. 1 to 5. The plant was operated at flow rates of between 3 to 1000 liters/hour with a range of ceramic membrane (filter) elements 18. The most appropriate membrane types were selected from these studies and the key process parameters were optimised. The work was carried out using synthetic hydrocarbon/water mixtures which were prepared to simulate the chemical composition and droplet-size distribution of typical oilfield produced waters. The pilot plant could not be operated in exactly the same way as a full-scale plant because a sufficient quantity of test water was not available for the trials; the experimental measurements were therefore supplemented with modelling studies to estimate the performance of the full-scale plant. The pilot-plant trials showed that the dispersed oil level could be reduced from initial levels of 500 mg/l to between 5 and 15 mg/l (depending on the operating conditions). The synthetic produced water samples had total dispersed oil levels of 500 mg/l with a mean (by number) oil-droplet size of 2 μm. The fluxes for the selected membrane type varied from 9000 $lm^{-2}h^{-1}$ (initially) to 2000 $lm^{-2}h^{-1}$ at saturation (compared with typical fluxes of 200 to 350 $lm^{-2}h^{-1}$ for cross-flow membranes that achieve comparable oil removal).

Plant scale-up is relatively straightforward because the process is modular, and the pilot-plant was constructed with the same membrane (filter) elements as would be used in the full-scale plant. However an area of uncertainty was the properties of the synthetic produced water compared with real samples, particularly with regard to the presence of higher molecular weight ($>C_{40}$) hydrocarbons and the surfactant properties of the produced water.

The data obtained from the pilot-plant measurements were used to prepare the design for a large-scale demonstration plant 100, constructed according to the principles described above in relation to FIG. 6, and sized for a capacity of up to 100 m³/h with water.

The results from the demonstration-plant trials showed that the oil removal was somewhat better than was obtained from the pilot-plant trials, with typical final levels under 10 mg/l, but the final (saturation) fluxes were somewhat lower at 1250 to 1700 $lm^{-2}h^{-1}$. This may have been due to the presence of $C_{20}$-$C_{40}$ hydrocarbons in the water, which indicates the benefits of some pre-treatment; but the lower fluxes may also be due to the presence of intermittent oil slugs in the supply.

On the basis of the data obtained from the demonstration-plant measurements, comparative full scale plant designs have been prepared, which show that the membrane area is lower than that for conventional, prior cross-flow membranes by a factor of about 4-9, with a correspondingly lower plant cost. The operating cost is also lower by a factor of 5 because of the lower pumping costs. The plant foot print is also about 50% of that for a conventional cross-flow plant.

The process of the present invention is a hybrid dead-end and cross-flow filtration process using ceramic microfiltration membranes. Dispersed hydrocarbons and solids are removed by the combined action of the ceramic membrane and also, in common with many other filtration processes, the fouling layer. The membrane and operating regime are developed so that the combined effects of the membrane and fouling layer achieve the required degree of treatment within about 60 to 100 seconds of the start of operation with a clean membrane.

Pilot-Plant Studies

As explained, an outline for the pilot plant 10 is shown in FIG. 1. The flow scheme is essentially the same as that for a dead-end filtration system but with additional valving to include the cross-flow features. The dimensions of the membrane modules 12 varied from 40 mm diameter×700 mm to 100 mm diameter×1200 mm, depending on the membrane type. The membrane elements 18 in the pilot plant were the same as those used in the demonstration plant.

The dispersed oil in the treated water stream was measured using an in-line oil-in-water monitor (refractive index) 52. Hydrocarbon analyses of the feed and treated water were also carried out by gas-liquid chromatography using a 60 m capillary column (carbowax) and flame ionisation detection.

The pilot plant 10 was operated to investigate the effect of varying the key process parameters on the final oil level and the membrane flux, and to optimise these parameters with respect to the treatment capacity and treated-water quality. The key parameters were the feed flow rate, trans-membrane pressure, cross-flow rate, and reverse-flush frequency (also referred to as the dump cycle above).

Produced water samples were prepared to give a total oil concentration of 500 mg/l in water containing 1% sodium chloride. Several methods were investigated to prepare a representative droplet-size distribution, including stirring and high-shear pumping. It was found that a high-rate centrifugal pump prepared the most representative distribution, with a median droplet size towards the lower end of the range reported for oil produced water. The mean droplet size by number was 2.07 μm. For comparison, droplet size distributions were determined for a produced water sample from an inland oilfield facility. The mean size by number was 2.62 μm, slightly higher than the synthetic sample, and the oil concentration was 266 mg/l. The oil dispersion was prepared using the high-rate centrifugal pump for all of the pilot-plant trials since this provided the most demanding test of the process.

Figure 12:
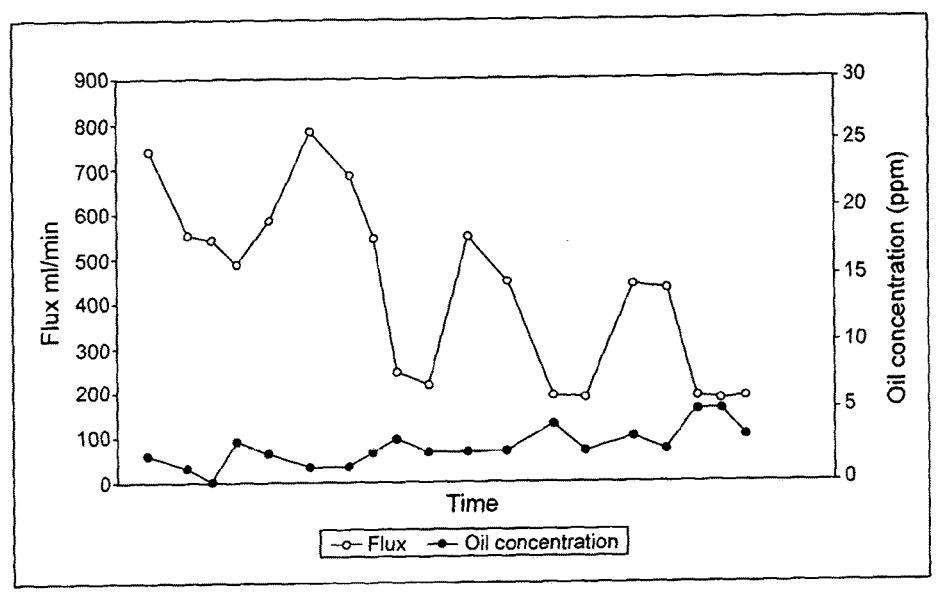
FIGS. 12 and 13 are graphs illustrating results of tests of the plant shown in FIG. 1.
Figures 13, 14:
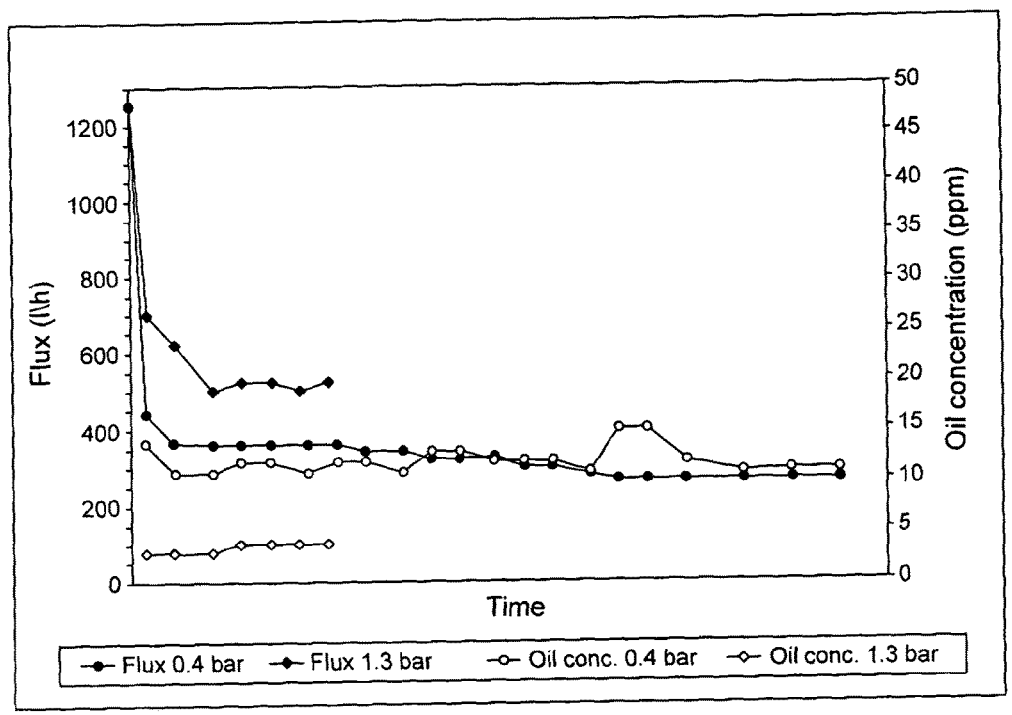
FIG. 14 is a graph illustrating results of a test of the plant shown in FIG. 6.

Typical pilot-plant results for two of the membrane types that were considered are shown in FIGS. 12 and 13, which show the operating membrane flux and oil level in the treated produced water over time and as a function of trans-membrane pressure. The first membrane type (FIG. 12) achieved a final oil level of under 5 mg/l at a flux varying from 800 to 200 l/m²/h. The second membrane type (FIG. 13) achieved final oil levels from 5 mg/l to 15 mg/l (depending on the operating parameters), with fluxes declining from initial values of 9000 to about 2000 l/m²/h at saturation.

Demonstration Plant Studies

The demonstration plant 100 was designed on the basis of key design parameters determined from the pilot-plant 10 measurements. The plant was designed for a capacity, with water, of up to 100 m³/h, and for semi-automatic operation. The feed pump generates a pressure of 2.5 bar, and the plant is designed for a trans-membrane pressure of 0.2 to 2.5 bar. The maximum operating pressure of the plant is 10 bar, which allows for a produced water supply pressures from zero to 7.5 bar. The plant contains four membrane modules with a total membrane area of 10 m².

The produced water supply was initially taken from a transfer line from an oil-water separator to the produced water storage tank (prior to re-injection). This stream also contained the water underflow from an oil heater. Difficulties were encountered with oil slugs in the produced water arising from upstream process upsets. Attempts were made to prevent oil slugs entering the plant by stopping the heater underflow. However this did not eliminate the slugs. Whilst the slugs prevented continuous operation of the plant, the trials did demonstrate that the membranes can tolerate neat oil and can be easily regenerated using the cleaning-in-place procedure. These are significant advantages over prior polymer membrane technologies.

The process configuration was changed so that the produced water supply to the plant 200 was taken from a re-injection storage tank. This reduced the risk of oil slugs and allowed the plant to be operated for extended periods. The main process parameters were adjusted to optimise the process, and to quantify the process performance with regard to the oil level in the treated produced water, the maximum flux, cycle times, cleaning intervals, and other operating parameters.

Typical results for daily operations at the optimised set of conditions are given in FIG. 14. The graphs show the dispersed oil level in the treated water returned to the produced water storage tanks. Results are shown for two trans-membrane pressures (TMPs): it can be seen that lower TMPs give a lower final oil level, however the membrane flux declines as the TMP is lowered.

The results show that the demonstration plant 100 achieved slightly better final oil levels than those that were determined from the pilot-plant 10 measurements. The lowest oil level achieved was 6 mg/l, and the levels were typically lower than 10 mg/l at the lower TMP. The inlet oil levels were typically between 60 and 100 mg/l, with peaks up to 250 mg/l and occasional oil slugs. The observed improvement in oil removal by the demonstration plant is probably a consequence of the lower oil level in the feed, on average, compared with the synthetic effluent that was used for the pilot-plant trials.

The membrane fluxes in the demonstration plant were found to be slightly lower than those predicted from the pilot-plant study and modelling calculations. However the fluxes were higher by a factor of 4 to 9 than those from prior cross-flow microfiltration processes. A difficulty was encountered during the long-term trials because upstream process upsets still led to occasional oil slugs and periodic very high inlet oil levels. The process of the invention may therefore be capable of a higher flux with a stable produced water supply and the absence of oil slugs.

Subsequent demonstration plant trials with produced water at flow rates up to 100 m3/hour have been carried out. The trials proved the above process efficiency at feedstream oil levels up to 1000 ppm, solids levels up to 100 ppm, with droplet and particle sizes from 1 micron to 100 microns, and oil API gravities of 14 and 36. The flux rates obtained from these trials were higher, up to 2500 l/m2/h. Filtrate oil levels of less than 10 ppm and solids levels of less than 10 ppm were consistently achieved during these trials.

Full-Scale Plant Design and Economic Data

Process and plant designs for the full-scale plant 200 (FIGS. 7 to 9) have been prepared using the results from the demonstration plant 100 (FIG. 6) trials, for a range of design cases from 300 m³/h to 2400 m³/h. Scale-up from the demonstration plant 100 data to larger-scale plants is straightforward because the same membrane modules are used at all scales. The bulk of the investment cost in prior cross-flow plants is the cost of the membrane modules; the lower membrane area that is required for the process of the present invention is therefore reflected in the anticipated plant costs. Comparative costs for the process of the present invention ("SRCF process"), and for prior cross-flow processes, are given in the table below, for the 1200 m³/h case.

|  | Capital cost £M | Operating cost £/m³ | Plant foot print m² |
| --- | --- | --- | --- |
| Cross-flow microfiltration | 19.0 | 1.73 | 288 |
| SRCF process | 3.42 | 0.32 | 180 |

The largest single component of the operating cost for both processes is the power requirement for a re-circulation pump. Since the cross-flow velocity is lower for the process of the present invention, the pumping power is lower, and this is reflected in the table.

Various modifications may be made to the foregoing without departing from the spirit or scope of the present invention.

For example, further aspects or embodiments of the present invention may comprise one or more features derived from one or more aspects or embodiments of the invention described above.

Generally tubular cylindrical and flat plate filter elements (membranes) are shown in the drawings and described above. However, the filter elements can have any suitable shape, and so may be non-cylindrical tubular elements, plate type filter elements which are curved in one or more direction (e.g. in a length and/or width direction), or some other configuration.

Methods of filtering contaminants from a fluid are disclosed herein in which, following the flow of feedstream fluid in one of said forward and said reverse flow directions, feedstream fluid is caused to flow through said filter element in the other one of said forward and said reverse flow directions, to remove contaminant material from a surface of the wall of the filter element. It will be understood, however, that it is within the range of possibilities of the invention that, following flow in the selected forward/reverse direction, flow in the other direction to remove contaminant material at least initially employs a fluid other than the feedstream fluid. For example, flow may initially employ a cleaning fluid, and then be changed over to feedstream fluid once it has been determined or estimated that the wall of the element has been adequately cleaned by flow in said other direction.

The invention claimed is:

1. A method of filtering contaminants from a fluid, the method comprising the steps of:
   directing a feedstream fluid containing contaminants into a filter chamber containing at least one filter element;
   arranging at least part of the feedstream fluid directed into the filter chamber to flow in one of:

A. a forward flow direction where the fluid passes in a first direction through a wall of the filter element; and B. a reverse flow direction where the fluid passes through the wall of the filter element in a second direction which is opposite the first direction;

directing filtrate out of the filter chamber and into a filtrate flowline for collection;

subsequently arranging at least part of the feedstream fluid directed into the filter chamber to flow through said filter element in the other one of the forward and reverse flow directions, to remove contaminant material from a surface of the wall of the filter element;

following removal of said contaminant material by fluid flow in the other one of the forward and reverse flow directions, continuing to direct at least part of the feedstream fluid through the wall of the filter element in said other one of the forward and reverse flow directions to thereby filter out contaminants from the fluid during flow in said other one of the forward and reverse flow directions; and subsequent to removal of said contaminant material, directing the filtrate resulting from flow through the wall of the filter element in said other one of the forward and reverse flow directions out of the filter chamber and into the filtrate flowline for collection.

2. A method as claimed in claim 1, comprising the further step of monitoring at least one parameter and, on detecting a predetermined change in the at least one parameter, taking the step of subsequently arranging at least part of the feedstream fluid to flow through the wall of the filter element in the other one of the forward and reverse flow directions.

3. A method as claimed in claim 2, in which the step of arranging the feedstream fluid to flow through the wall of the filter element in the other one of the forward and reverse flow directions is taken on the first to occur of: detecting the predetermined change in the at least one parameter; and expiry of a predetermined time period.

4. A method as claimed in claim 2, in which the parameter is the flux through the filter element, the feedstream fluid arranged to flow in said other direction on detection of the flux reaching a predetermined threshold level.

5. A method as claimed in claim 2, in which the parameter is the concentration of contaminants in the filtrate, an increase in the concentration of contaminants being indicative of a deterioration in performance, requiring a change in the direction of flow of feedstream fluid through the filter element to clean the surface of the wall of the filter element.

6. A method as claimed in claim 2, in which the method comprises sequentially changing the direction of flow of the feedstream fluid between the forward and reverse flow directions in response to detection of the pre-determined change in the measured parameter and/or expiry of the predetermined time period.

7. A method as claimed in claim 2, in which, following completion of at least one cycle of flow of feedstream fluid in the forward flow and reverse flow directions, and in the event that the predetermined change in the measured parameter occurs within a time period which is reduced compared to a time period in which the predetermined change in the measured parameter previously occurred, the method comprises the step of cleaning the filter element by directing a cleaning fluid into the filter chamber and arranging the fluid to flow in either the forward or reverse flow direction.

8. A method as claimed in claim 7, comprising directing cleaning fluid in a direction which is opposite to the direction that fluid was flowing prior to detecting that the predetermined change occurred within the reduced time period.

9. A method as claimed in claim 7, comprising the step of subsequently re-directing feedstream fluid into the filter chamber and arranging the fluid to flow through the wall of the filter element in a selected one of the forward and reverse flow directions.

10. A method as claimed in claim 2, in which the at least one parameter which is measured is selected from the group comprising the flux through the filter element; a pressure drop measured across the filter element; and a proportion or concentration of contaminants remaining in the filtrate.

11. A method as claimed in claim 1, in which the step of subsequently arranging the feedstream fluid to flow through the wall of the filter element in the other one of the forward and reverse flow directions is taken after a predetermined time period.

12. A method as claimed in claim 1, comprising arranging at least part of the feedstream fluid directed into the filter chamber to flow in one of the forward and reverse flow directions; and arranging a remainder of the feedstream fluid directed into the filter chamber to flow in a cross-flow bleed stream across the filter element and into a bleed flowline.

13. A method as claimed in claim 12, in which the remainder of the feedstream fluid flowing across the filter element in the cross-flow bleed stream is arranged to flow with a velocity of no more than about 4 m/s, to promote the formation of a fouling layer of contaminant material on the surface of the filter element, such that filtering of further contaminant material is achieved by means of a combination of the filter element and the fouling layer.

14. A method as claimed in claim 12, in which a volume of the feedstream fluid that is arranged to flow in the cross-flow bleed stream across the filter element is at least about 5% of the total volume of the feedstream fluid in the feedstream.

15. A method as claimed in claim 12, in which the remainder of the feedstream fluid in the cross-flow bleed stream is arranged to flow with a laminar flow profile, to promote the formation of a fouling layer of contaminant material on the surface of the filter element, such that filtering of further contaminant material is achieved by means of a combination of the filter element and the fouling layer.

16. A method as claimed in claim 12, in which the feedstream fluid is aqueous, and the feedstream fluid in the cross-flow bleed stream is arranged to flow in the bleed stream such that it has a Reynolds number of no more than about 2500, to promote the formation of a fouling layer of contaminant material on the surface of the filter element, such that filtering of further contaminant material is achieved by means of a combination of the filter element and the fouling layer.

17. A method as claimed in claim 12, in which the filter element has a plurality of pores for filtering contaminants from the feedstream fluid, the pore size being no less than about 4 microns; and in which the method comprises controlling one or more parameters of the cross-flow bleed stream to promote the formation of a fouling layer on the surface of the filter element, such that filtering of contaminant material is achieved by a combination of the filter element and the fouling layer.

18. A method as claimed in claim 1, in which the at least one filter element is hollow, and in which:

A. in the forward flow direction, the feedstream fluid passes in the first direction through the wall of the filter element from an inside of the filter element to an outside of the filter element; and B. in the reverse flow direction, the feedstream fluid passes in the second direction through the wall of the filter element from the outside of the filter element to the inside of the filter element.

19. A method as claimed in claim 1, in which the at least one filter element is in the form of a generally flat plate having opposed first and second surfaces, and in which:

A. in the forward flow direction, the feedstream fluid passes in the first direction through the wall of the filter element from the first surface towards the second surface; and B. in the reverse flow direction, the feedstream fluid passes in the second direction through the wall of the filter element from the second surface towards the first surface.

20. A method as claimed in claim 1, comprising monitoring a concentration of contaminants in the filtrate during flow in said other one of the forward and reverse flow directions and, on detecting that the concentration of contaminants has fallen to a desired level, carrying out the step of directing the filtrate into the filtrate flowline for collection.

21. A method as claimed in claim 1, in which, subsequent to the removal of said contaminant material and filtration in the other one of the forward and reverse flow directions, the method comprises the further step of arranging the feedstream fluid directed into the filter chamber to again flow through the filter element in the one of the forward and reverse flow directions which was initially selected, to remove contaminant material from the surface of the wall of the filter element which has resulted from fluid flow in the other one of the forward and reverse flow directions.

22. A method as claimed in claim 21, in which flow continues in the one of the forward and reverse flow directions which was initially selected and, subsequent to removal of said contaminant material, the filtrate resulting from such flow is directed out of the filter chamber and into the filtrate flowline for collection.

23. A method as claimed in claim 22, comprising monitoring a concentration of contaminants in the filtrate during flow in said initial direction and, on detecting that the concentration of contaminants has fallen to a desired level, carrying out the step of directing the filtrate into the filtrate flowline for collection.

24. A method as claimed in claim 1, comprising directing the feedstream fluid into at least one further filter chambers, and in which each of the filter chambers contains a plurality of filter elements.

25. A method as claimed in claim 24, comprising taking at least one of the filter chambers offline for the purpose of a flow reversal cycle in which at least part of the feedstream fluid is directed in the other one of the forward and reverse flow directions to remove contaminant material, with filtration through at least one other filter chamber continuing.

* * * * *